(12) United States Patent
Mackie et al.

(10) Patent No.: US 9,742,668 B1
(45) Date of Patent: *Aug. 22, 2017

(54) PACKET FORWARDING PATH PROGRAMMING USING A HIGH-LEVEL DESCRIPTION LANGUAGE

(71) Applicant: Juniper Networks, Inc., Sunnyvale, CA (US)

(72) Inventors: Scott Mackie, Santa Cruz, CA (US); James Washburn, Palo Alto, CA (US); Nitin Kumar, Fremont, CA (US); Sandeep Bajaj, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/822,507

(22) Filed: Aug. 10, 2015

Related U.S. Application Data

(63) Continuation of application No. 14/456,928, filed on Aug. 11, 2014, now Pat. No. 9,106,581, which is a continuation of application No. 13/194,571, filed on Jul. 29, 2011, now Pat. No. 8,806,058.

(51) Int. Cl.
  *H04L 12/721* (2013.01)
  *H04L 12/771* (2013.01)
  *H04L 12/773* (2013.01)

(52) U.S. Cl.
  CPC .............. *H04L 45/44* (2013.01); *H04L 45/56* (2013.01); *H04L 45/60* (2013.01)

(58) Field of Classification Search
  CPC .......... H04L 45/44; H04L 45/56; H04L 45/60
  See application file for complete search history.

(56) References Cited

U.S. PATENT DOCUMENTS

| | | |
|---|---|---|
| 7,215,637 B1 | 5/2007 | Ferguson et al. |
| 7,649,904 B1 | 1/2010 | Ghosh et al. |
| 7,990,993 B1 | 8/2011 | Ghosh et al. |
| 8,806,058 B1 | 8/2014 | Mackie et al. |
| 9,106,581 B1 | 8/2015 | Mackie et al. |

OTHER PUBLICATIONS

Prosecution History from U.S. Appl. No. 13/194,571, dated Oct. 17, 2011 through Apr. 14, 2014, 344 pp.
Prosecution History from U.S. Appl. No. 14/456,928, dated Jan. 5, 2015 through Apr. 16, 2015, 22 pp.

*Primary Examiner* — Michael Thier
*Assistant Examiner* — Brian Cox
(74) *Attorney, Agent, or Firm* — Shumaker & Sieffert, P.A.

(57) ABSTRACT

In general, this disclosure describes a high-level forwarding path description language (FPDL) for describing internal forwarding paths within a network device. The FPDL enables developers to create a template that describes a section of an internal forwarding path within the forwarding plane of a network device. The FPDL provides syntactical elements for specifying the allocation of forwarding path structures as well as enabling the run-time construction of internal forwarding paths to interconnect the forwarding path structures in a manner specific to packet, packet flow, and/or interface properties, for example. In conjunction with late binding techniques, whereby the control plane of the network device provides arguments to template parameters that drive allocation by the packet forwarding engines of forwarding path structures specified by the FPDL, the techniques provide control plane processes a unified interface with which to manage the operation of the packet forwarding engines.

20 Claims, 10 Drawing Sheets ately to one or more specific output interfaces of interface cards of the network device. In some cases, the control unit may install the forwarding structures into each of the PFEs to update the FIB within each of the PFEs and control traffic forwarding within the data plane. Bifurcating control and data plane functionality allows the FIB in each of PFEs to be updated without degrading packet forwarding performance of the network device.
PACKET FORWARDING PATH PROGRAMMING USING A HIGH-LEVEL DESCRIPTION LANGUAGE

CROSS REFERENCE TO RELATED APPLICATIONS

This application is a continuation of U.S. application Ser. No. 14/456,928, filed Aug. 11, 2014, which is a continuation of U.S. application Ser. No. 13/194,571, filed Jul. 29, 2011, now U.S. Pat. No. 8,806,058, the entire content of which is incorporated herein by reference.

TECHNICAL FIELD

The invention relates to packet-based computer networks and, more particularly, to forwarding packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of packet forwarding engines (PFEs) and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding structures generated by the control unit in accordance with the routing information and control information. The control unit installs the forwarding structures within the data plane to programmatically configure the forwarding components. The data and instructions that constitute the forwarding structures define an internal forwarding path for each incoming packet received by the network device. For example, to generate a route table lookup forwarding structure, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the PFEs to update the FIB within each of the PFEs and control traffic forwarding within the data plane. Bifurcating control and data plane functionality allows the FIB in each of PFEs to be updated without degrading packet forwarding performance of the network device.

SUMMARY

In general, the disclosure specifies techniques for describing internal forwarding paths within a network device using a high-level forwarding path description language. The forwarding path description language enables developers to create a template that describes a section of an internal forwarding path within the forwarding plane of a network device. The forwarding path description language provides syntactical elements for creating the template in a form that specifies the allocation of forwarding path structures as well as enables the run-time construction of internal forwarding paths to interconnect the forwarding path structures in a manner specific to packet, packet flow, and/or interface properties, for example. In conjunction with late binding techniques, whereby the control plane of the network device provides arguments to parameters within the template that drive allocation by the packet forwarding engines of forwarding path structures specified by the high-level description language, the techniques provide control plane processes a unified interface with which to manage the operation of the packet forwarding engines.

The syntactical elements of the forwarding path description language may include specialized variables to reference instantiated forwarding path structures, built-in constructor functions for particular forwarding path structure types, and argument variables to define interfaces for programs that conform to the language. A program lookup statement causes the forwarding component within the data place (e.g., a packet forwarding engine) to mark and generate a placeholder for a forwarding path lookup for a lookup structure that is populated at run-time by operation of control plane processes with items bound to actions specified by the program. A program includes one or more code blocks that contain variable declarations, statements, and conditions, for example, to define the program logic for instantiation in the internal forwarding path and execution by a PFE hardware engine or other forwarding component. Program code blocks may be internally referenced by the forwarding component and allow developers to specify execution flow for the program in the forwarding component operating environment, which provides a limited calling context.

The described techniques may be useful in advanced devices that bifurcate control and forwarding plane functionality. In such devices, the control plane determines the operations of the forwarding plane applied to received packets. As a result, control plane processes manage the allocation of forwarding path structures and drive the construction of the internal forwarding path in accordance with data structures, such as route tables, derived by operation of the control plane processes. However, the packet forwarding engines translate directives from the control plane to generate the forwarding paths, and hardware engines of the packet forwarding engines perform lookups and otherwise execute the forwarding path to apply services to received packets.

The described techniques may provide one or more advantages. For example, the syntax of the forwarding path description language, which enables compile-time and run-time configurability of programs and program operation, may enable developers that use the language to both manage allocation of forwarding path structures and drive the construction of the forwarding path by control plane processes at a high level. As a result, the forwarding path description language allows developers to combine run-time lookup data management with already compiled programs written using the language, thus providing a single interface with which to construct the forwarding paths. In addition, the forwarding components may bind data received from the control plane to programs already instantiated within the forwarding component to add new features to the forwarding path. As a result, the techniques may enable separation between compiled programs and lookup data, which may mitigate additional compilation of the programs because of the mixed instruction/data architecture of modern packet forwarding engines. Pre-compile directives provided for by the forwarding path description language allow programs code sections to be conditionally included according to control plane directives, which may reduce the number of permutations of a program required for different hardware. The forwarding path description language additionally includes syntactical elements that may enable developers to overcome limitations of conventional high-level programming languages with respect to particular characteristics of the underlying packet forwarding engine architecture, such as limited provision for a variable infrastructure and limited support for call/return program flow.

In one embodiment, the invention is directed to a method comprising sending program text for a program that conforms to a general-purpose high-level forwarding path description language (FPDL) from a control unit of a network device to a forwarding component of the network device. The method also comprises compiling the program text with the forwarding component to a platform-independent intermediate representation, and sending program arguments for the program from the control unit to the forwarding component. The method also includes compiling the intermediate representation with the forwarding component using the program arguments to generate a forwarding path block having one or more forwarding structures for execution by the forwarding component to process packets. The method further comprises installing the forwarding path block to an internal packet forwarding path of the forwarding component, receiving a packet with the forwarding component, and processing the received packet by executing the forwarding path block.

In another embodiment, the invention is directed to a method comprising generating program text for a program that conforms to a high-level forwarding path description language (FPDL) syntax and describes an internal packet forwarding path for a network device. The method also comprises defining a lookup primitive for the network device in the program text and generating a lookup statement in the program text that conforms to the FPDL syntax, keys the lookup primitive to a packet property, and defines one or more actions for execution upon matching a value for the packet property to an item added to the lookup primitive.

In another embodiment, the invention is directed a network device comprising a forwarding component comprising an interface card that receives a packet, a compiler, a programming interface, a key engine, and an internal packet forwarding path comprising programmable, executable microcode that determines processing of the packet. The network device also comprises a control unit comprising a computer-readable storage medium that stores a program that conforms to a general-purpose high-level forwarding path description language (FPDL); and a forwarding component interface that sends program text for the program to the forwarding component, wherein the forwarding component interface sends program arguments for the program to the forwarding component, wherein the programming interface receives the program text and program arguments, wherein the compiler compiles the program text to a platform-independent intermediate representation and then compiles the intermediate representation using the program arguments to generate a forwarding path block having one or more forwarding structures for execution by the forwarding component to process the packet, wherein the programming interface installs the forwarding path block to the internal packet forwarding path of the forwarding component, and wherein the key engine processes the packet by executing the forwarding path block.

In another embodiment, the invention is directed to non-transitory computer-readable medium containing instructions. The instructions cause one or more programmable processors to send program text for a program that conforms to a high-level forwarding path description language (FPDL) from a control unit of a network device to a forwarding component of the network device. The instructions also cause the programmable processors to send program arguments for the program from the control unit to the forwarding component. The instructions also cause the programmable processors to compile the program text using the program arguments to generate a forwarding path block having one or more forwarding structures for execution by the forwarding component to process packets. The instructions also cause the programmable processors to install the forwarding path block to an internal packet forwarding path of the forwarding component, receive a packet with the forwarding component, and process the received packet by executing the forwarding path block.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
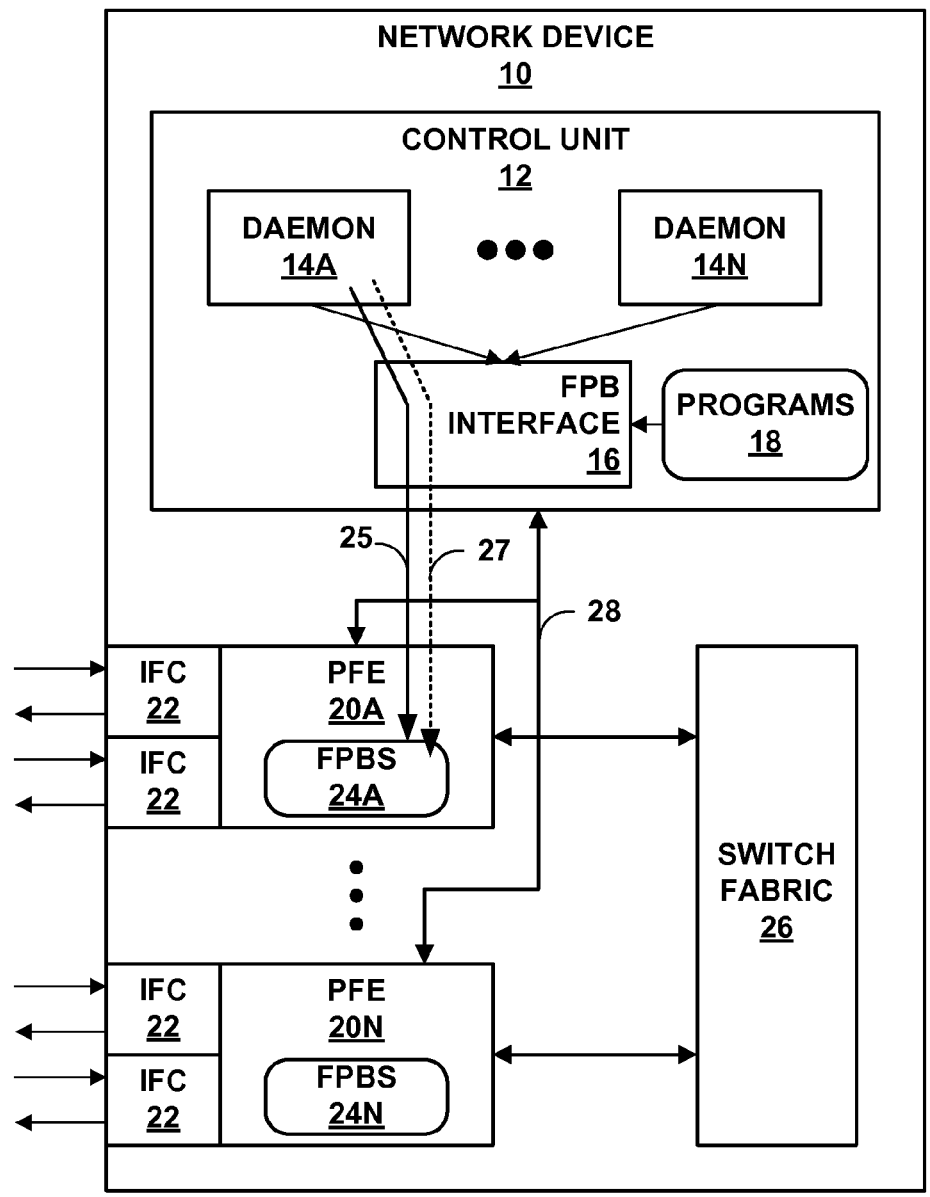
FIG. 1 is a block diagram illustrating an example network device that includes and executes programs written in a high-level forwarding path description language (FPDL) in accordance with principles described in this disclosure.

FIG. 1 is a block diagram illustrating an example network device 10 that includes and executes programs 18 written in a high-level forwarding path description language (FPDL) in accordance with principles described in this disclosure. Network device 10 may comprise a router such as a provider edge or customer edge router, a core router, or another type of network device, such as a switch.

In this example, network device 10 includes a control unit 12 that provides control plane functionality for the device. Network device 10 also includes a plurality of forwarding components in the form of example packet forwarding engines 20A-20N ("PFEs 20") and a switch fabric 26 that together provide a data plane for forwarding network traffic. PFEs 20 receive and send data packets via interfaces of interface cards 22A-22N ("IFCs 22") each associated with a respective one of PFEs 20. Each of PFEs 20 and its associated ones of IFCs 22 may reside on a separate line card for network device 10 (not shown). Example line cards include flexible programmable integrated circuit (PIC) concentrators (PFCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces. In various aspects, each of PFEs 30 may comprise more or fewer IFCs. Switch fabric 26 provides a high-speed interconnect for forwarding incoming data packets to the selected one of PFEs 30 for output over a network.

Control unit 12 is connected to each of PFEs 20 by internal communication link 28. Internal communication link 28 may comprise a 100 Mbps Ethernet connection, for instance. Daemons 14A-14N ("daemons 14") executed by control unit 12 are user-level processes that run network management software, execute routing protocols to communicate with peer routing devices, maintain and update one or more routing tables, and create one or more forwarding tables for installation to PFEs 20, among other functions.

Control unit 12 may include one or more processors (not shown in FIG. 1) that execute software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

PFEs 20 process packets by performing a series of operations on each packet over respective internal packet forwarding paths as the packets traverse the internal architecture of network device 10. Operations may be performed, for example, on each packet by any of a corresponding ingress interface, an ingress PFE 20, an egress PFE 20, an egress interface or other components of network device 10 to which the packet is directed prior to egress, such as one or more service cards. PFEs 20 each include forwarding structures that, when executed, examine the contents of each packet (or another packet property, e.g., incoming interface) and on that basis make forwarding decisions, apply filters, and/or perform accounting, management, traffic analysis, and load balancing, for example. In one example, each of PFEs 20 arranges forwarding structures as next hop data that can be chained together as a series of "hops" along an internal packet forwarding path for the network device. The result of packet processing determines the manner in which a packet is forwarded or otherwise processed by PFEs 20 from its input interface on one of IFCs 22 to its output interface on one of IFCs 22.

In many instances, the forwarding structures perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Each of programs 18 stored by control unit 12 comprises text that conforms to a high-level forwarding path description language syntax that accords with the principles of this disclosure. In other words, each of programs 18 is an FPDL program. Each of programs 18 specify, using a high-level language syntax, the features of a section of a packet forwarding path within network device 10. Programs 18 specify functions to be performed on the packet, including fundamental packet forwarding operations such as input packet processing, route lookup, and output packet processing, as well as service functions such as packet filtering or access control, statistical sampling, traffic policing, rate limiting, and accounting.

When bound to a set of arguments, respective programs 18 define, for packet forwarding paths of PFEs 20, a forwarding path block forwarding structure that is a packet forwarding path peer of a firewall, next-hop, or route table. A forwarding path block, defined by one programs 18 bound to a set of arguments and instantiated within PFEs 20 as respective forwarding path blocks 24A-24N ("FPBs 24"), may itself be composed of multiple other forwarding structures, such as lookup operations and policing, management, counting, and filtering functions, for example.

Daemons 14 at run-time identify individual programs 18 for compilation and instantiation as FPBs 24 in order to apply functions designated by the daemons for the forwarding plane functionality of network device 10. For example, one of daemons 14 may execute the Border Gateway Protocol (BGP) and receive a message from a BGP peer that causes the daemon to trigger a particular BGP function defined by one of programs 18. As another example, one of daemons 14 may execute a command line interface (CLI) that receives, from a user, a command to apply a policing function that is defined by one of programs 18 to rate limit a particular traffic flow at a particular rate. In response, daemons 14 invoke FPB interface 16 to select the appropriate ones of programs 18 for installation to PFEs 20 as FPBs 24. As used herein, the term "run-time" refers to any time after network device 10 is deployed within a network environment versus pre-compiled and installed within the network device at the time of manufacture. Run-time may thus refer to the setup and configuration upon power-up of network device 10 as well as full operation, for instance.

FPB interface 16 presents an interface to the forwarding components (in this example, PFEs 20) by which daemons 14 may select one or more of programs 18, provide a set of arguments to bind to the selected programs, direct the instantiation of FPBs 24 within PFEs 20 to establish packet forwarding paths, and provide lookup data with which to modify lookup data structures referenced in programs 18. FPB interface 16 may comprise one or more user- or kernel-level libraries, programs, toolkits, application programming interfaces (APIs) and may communicate programs, arguments, and lookup data to PFEs 20 via internal communication link 28 using sockets.

In the illustrated example, daemon 14A invokes FPB interface 16 to install a forwarding path block forwarding structure to FPBs 24A of PFE 20A. Daemon 14A selects one of programs 18A and provides to FPB interface 16 a set of arguments to bind to the selected program. In response, FPB interface 16 sends the selected one of programs 18 to PFE 20A as FPDL description structure 25, a data structure that includes information needed by PFEs 20 to instantiate the program. For example, FPDL description structure 25 for the selected program may specify the program text (i.e., the program in textual form), the program name, and argument variables that define an interface to the program. In some instances, FPB interface 16 sends FPDL description data structures for each of programs 18 to PFEs 20 during a configuration/setup phase for the PFEs. Although described with respect to PFEs 20 by way of example, the techniques herein can be used to configure other types of forwarding components.

In addition, FPB interface 16 creates and sends, as a distinct structure, FPB description structure 27 to PFE 20A. FPB description structure 27 is a data structure that references FPDL description structure 25 and includes the arguments provided by daemon 14A for binding to the selected one of programs 18 described by FPDL description structure 25. FPB interface 16 assigns a unique, system-wide identifier to each FPB description structure. FPB description structure 27 includes the information required for a particular instance of the selected one of programs 18 described by FPDL description structure 25. Other FPB description structures may also reference FPDL description structure 25 and yet include different information for a different instance of the selected one of programs 18.

Each of FPDL description structure 25 and FPB description structure 27 may comprise tables, structs/classes, or other data structure types to carry the requisite information. FPB interface 16 may send FPDL description structure 25 and FPB description structure 27 to PFE 20A in separate messages or in a combined message.

PFE 20A receives FPDL description structure 25 and locally compiles the included program text to intermediate code representation, or "pseudo-code," that includes placeholders for argument variables that may be bound (e.g., parameterized) with argument values specified by various FPB description structures. PFE 20A also receives FPB description structure 27, responsively loads the intermediate code to the forwarding hardware, and binds (or "links") the argument values specified therein to the corresponding argument variable placeholders in the loaded intermediate code to create and install a new forwarding path block in FPBs 24A. In this manner, PFE 20A creates a new forwarding path structure in the packet forwarding path. In some aspects, PFE 20A binds an argument value of FPB description structure 27 to an argument variable placeholder of FPDL description structure 25 by writing the argument value to the memory location for the argument variable placeholder. The argument value may represent another memory location, a forwarding path reference that specifies another forwarding path structure, or another type of reference that facilitates packet forwarding path construction.

Subsequently, PFE 20A may receive additional FPB description structures that correspond to FPB description structure 27 and have updated argument values. PFE 20A rebinds these updated argument values to argument variables of the new forwarding path block created for FPB description structure 27 to modify the program flow from and/or within the new forwarding path block. That is, PFE 20A changes the argument set for a program already instantiated as a forwarding path block. Moreover, PFE 20A may receive additional FPB description structures that also reference FPDL description structure 25 yet are not associated with FPB description structure 27. The additional FPB description structures in this case, in other words, direct PFE 20A to create a separate instance of the referenced program as a separate forwarding path block. As a result, the techniques allow numerous instances of the same program to be used with different argument sets without prompting a recompilation of the program by PFEs 20. As a result, daemons 14 by invoking FPB interface 16 may more easily and flexibly modify the forwarding paths of PFEs 20.

Figure 2:
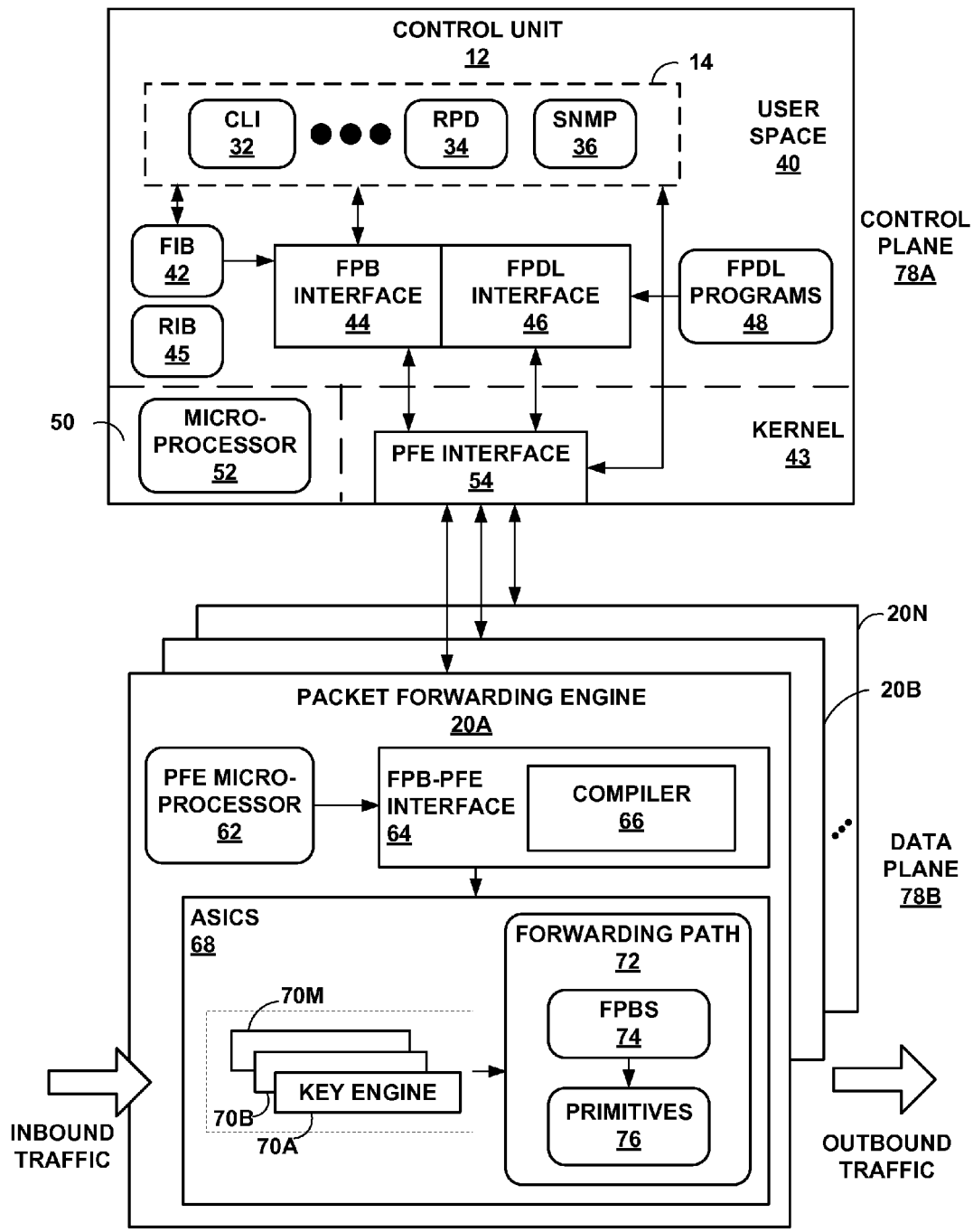
FIG. 2 is a block diagram illustrating an example embodiment of the network device of FIG. 1 in further detail.

FIG. 2 is a block diagram illustrating an example embodiment of network device 10 of FIG. 1 in further detail. In this example, control unit 12 provides a control plane 78A operating environment for execution of various user-level daemons 14 executing in user space 40. Daemons 14 in this example include command-line interface daemon 32 ("CLI 32"), routing protocol daemon 34 ("RPD 34"), and Simple Network Management Protocol daemon 36 ("SNMP 36"). In this respect, control plane 78A may provide routing plane, service plane, and management plane functionality for network device 10. Various instances of control unit 12 may include additional daemons 14 not shown in FIG. 2 that perform other control, management, or service plane functionality and/or drive and otherwise manage data plane functionality for network device 10.

Daemons 14 operate over and interact with kernel 43, which provides a run-time operating environment for user-level processes. Kernel 43 may comprise, for example, a UNIX operating system derivative such as Linux or Berkeley Software Distribution (BSD). Kernel 43 offers libraries and drivers by which daemons 14 may interact with the underlying system. PFE interface 54 of kernel 43 comprises a kernel-level library by which daemons 14, FPB interface 44, FPDL interface 46, and other user-level processes or user-level libraries may interact with PFEs 20. PFE interface 54 may include, for example, a sockets library for communicating with PFEs 20 over dedicated network links.

Hardware environment 50 of control unit 12 comprises microprocessor 52 that executes program instructions loaded into a main memory (not shown in FIG. 2) from storage (also not shown in FIG. 2) in order to execute the software stack, including both kernel 43 and user space 40, of control unit 12. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 34 executes one or more interior and/or exterior routing protocols to exchange routing information with other network devices and store received routing information in routing information base 45 ("RIB 45"). RIB 45 may include information defining a topology of a network, including one or more routing tables and/or link-state databases. RPD 34 resolves the topology defined by routing information in RIB 45 to select or determine one or more active routes through the network and then installs these routes to forwarding information base 42 ("FIB 42"). Typically, RPD 34 generates FIB 42 in the form of a radix or other lookup tree to map packet information (e.g., header information having destination information and/or a label stack) to next hops and ultimately to interface ports of interface cards associated with respective PFEs 20.

Command line interface daemon 32 ("CLI 32") provides a shell by which an administrator or other management entity may modify the configuration of network device 10 using text-based commands. Simple Network Management Protocol daemon 36 ("SNMP 36") comprises an SNMP agent that receives SNMP commands from a management entity to set and retrieve configuration and management information for network device 10. Using CLI 32 and SNMP 36, management entities may enable/disable and configure services, install routes, enable/disable and configure rate limiters, and configure interfaces, for example. As described in detail below, RPD 34, CLI 32, and SNMP 36 configure data plane 78B to implement configured services, add/modify/delete routes, and otherwise modify packet forwarding paths by installing forwarding structures to PFEs 20 using forwarding path block interface 44 ("FPB interface 44").

FPB interface 44 allows daemons 14 to drive the installation and configuration of forwarding path description language programs 48 ("FPDL programs 48") in packet forwarding paths. In particular, FPB interface 44 includes an application programming interface by which daemons 14 may request one of FPDL programs 48, bind the requested program to arguments, and send the arguments and the requested program to PFEs 20 for compilation, instantiation and installation by PFEs 20 to ASICs 68 as forwarding path blocks 74 ("FPBs 74"). FPDL interface 46 manages FPDL programs 48 and FPDL description structures. FPDL interface 46 includes an application programming interface accessible by FPB interface 44 and by which FPB interface 44 may direct FPDL interface 46 to send one of FPDL programs 48 to one of PFEs 20 within an FPDL description structure.

PFEs 20 implement data plane 78B (also known as a "forwarding plane") functionality to handle packet processing from ingress interfaces on which packets are received to egress interfaces to which packets are sent. Data plane 78B determines data packet forwarding through network device 10, applies services, rate limits packet flows, filters packets, and otherwise processes the packets using forwarding structures and lookup data installed by control plane 78A to data plane 78B. While FIG. 2 illustrates only PFE 20A in detail, each of PFEs 20 comprises similar components that perform substantially similar functionality.

PFE 20s bind actions to be performed on packets received by the PFEs to identification of one or more properties of the packets. That is, upon identifying certain packet properties, PFEs 20 perform the action bound to the properties. Packet properties may include packet metadata such as a particular packet's ingress interface or egress interface (as determined by the PFEs) as well as information carried by the packet and packet header, such as packet header fields, destination route prefixes, layer four (L4) or Transport Layer protocol destination ports, and the packet payload. Actions bound to packet characteristics may include count, discard, forward to a specified next-hop or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

PFE 20A includes ASIC-based packet processors ("ASICs 68") that process packets to identify packet properties and perform actions bound to the properties. ASICs 68 include one or more programmable application-specific integrated circuits having key engines 70A-70M ("key engines 70") that execute microcode (or "microinstructions") to control and apply fixed hardware components of ASICs 68 to process packet "keys." A packet key includes packet fields and other parameters that determine a flow of packet processing for the packet along an internal forwarding path. Each of key engines 70 includes one or more key buffers to store packet field data for corresponding packets that the key engine is currently processing. Key buffers may also provide limited writable memory to which elements of the internal forwarding path may write to pass messages accessible by future elements. Internal forwarding path 72 ("forwarding path 72") comprises programmable, executable microcode and fixed hardware components that determine the packet processing actions and other operations performed by key engines 70. Forwarding path 72 may include, for example, executable instructions, programmable logic, and application-specific logic that perform lookups, rate limit packet flows, and manipulate packet keys, among other functions. Internal forwarding paths of network device 10 may include combinations of respective forwarding paths 72 of PFEs 20. In other words, forwarding path 72 of PFE 20A may include only a part of the overall internal forwarding path of network device 10.

Primitives 76 of forwarding path 72 include data structures having entries, or "items," that correspond to packet key values and bind the values to actions to be performed by key engines 70 executing forwarding path 72. In this respect, primitives 76 represent a tightly-coupled combination of executable instructions that correspond to bound actions and of data for possible packet key values. A tree lookup one of primitives 76 may perform a longest-match prefix lookup in a routing table or search a list of prefixes in a filter program. A table lookup one of primitives 76 may determine whether another one of primitives 76 should be performed by key engines 70. For example, key engine 70A may perform a table lookup of packet properties to determine that key engines 70A should further perform a tree lookup to identify an outbound interface for the packet. PFE 20A may store primitives 76 and FPBs 74 in computer-readable storage media, such as static random access memory (SRAM). While illustrated within ASICs 68, primitives 76 may be stored in memory external to ASICs 68 onboard PFE 20A.

In some aspects, actions of forwarding path 72 use a next hop data structure to initiate processing. At the end of each processing step by one of key engines 70, such as execution of one of primitives 76 or of one of FPBs 74, the result is a next hop that may specify additional processing or the termination of processing, for instance. In addition, next hops may specify one or more functions to be executed by key engines 70. Example next hop functions include policing (i.e., rate limiting), counting, and sampling. Next hops thus form the primary data structure that can be used to initiate a lookup or an FPB 74, chain lookups and FPBs 74 to allow for multiple lookup and other operations to be performed on a single packet, and terminate a lookup or an FPB 74. Key engines 70 may be associated with respective result (or "lookup") buffers that store results for executing next hops. For example, key engine 70A may execute a lookup specified by a next hop and store the result of the lookup to the associated result buffer. The contents of a result buffer may affect the actions of the next hop in the next hop chain. Additional information regarding next hops and next hop chaining is available in PLATFORM-INDEPENDENT CONTROL PLANE AND LOWER-LEVEL DERIVATION OF FORWARDING STRUCTURES, U.S. application Ser. No. 12/266,298, filed Nov. 6, 2008, which is incorporated herein by reference in its entirety.

PFE microprocessor 62 manages ASICs 68 and executes FPB-PFE interface 64 to provide an interface to control unit 12. PFE microprocessor 62 may execute a microkernel to provide an operating environment for interfaces. FPB-PFE interface 64 is a programming interface receives FPDL and FPB description structures from PFE interface 54 of control unit 12. As described above, an FPB description structure binds arguments to FPDL program parameters identified in a FPDL description structure that includes one of FDPL programs 48.

FPB-PFE interface 64 receives FPDL programs 48 in textual form in FPDL description structure. That is, the programs as received by the PFEs conform to the high-level, forwarding path description language and may not comprise data executable by a processor, such as one of key engines 70. Compiler 66 of PFE 20A compiles FPDL programs 48 identified in FPDL description structures using the arguments provided in FPB description structures to generate microcode that constitutes a forwarding path block forwarding structure. In this way, compiler 66 creates executable instances of the FPDL programs 48 referenced in corresponding FPDL description structures and FPB description structures. Because each of PFEs 20 includes an instance of compiler 66, the compiler represents a distributed compiler for network device 10 that may provide PFE-specific compilation targeted to the particular chip-set represented by ASICs 68.

The arguments provided in FPB description structures may specify, for example, conditional compilation for portions of a specified one of FPDL programs 48 as well as next hops of forwarding path 72, including next hops that initiate FPBs 74 and primitives 76. FPB-PFE interface 64 installs compiled forwarding path blocks to forwarding path 72 as FPBs 74 for execution by key engines 70. By providing updated arguments for FPB description structures via FPB interface 44, daemons 14 can alter the operation of instantiated FPBs 74 by, for example, changing the next hops for the forwarding path blocks. In this way, daemons 14 may modify the operation of forwarding path 72 without necessitating a recompile, by compiler 66, of FPDL programs.

Some instantiated FPBs 74 specify one or more lookups operations using primitives 76. For example, one of FPBs 74 may specify a lookup operation using a tree one of primitives 76. These FPBs 74 lookups specify the actions to be performed for items bound to the actions in the primitives. In other words, each item of primitives 76 is bound to an action performed by key engines 70 for packets having keys that match the item. Instantiated FPBs 74 determine the actions to be performed. In some instances, the action to be performed may include executing a next hop external to a particular one of FPBs 74 and modifiable using FPB interface 44.

FPB interface 44 of control unit 12 provides an interface by which daemons 14 may add to, modify, or delete items of primitives 76 to modify packet processing by forwarding path 72 of packets having keys that match the items. For example, RPD 34 may invoke FPB interface 44 to add, to a lookup tree one of primitives 76 identified within one of FPBs 74, an item that binds a destination prefix to an action that includes a statement that references a next hop structure, which may be populated with a reference to another one of FPBs 74. As another example, CLI 32 may invoke FPB interface 44 to add, to a lookup table one of primitives 76 identified within one of FPBs 74, an item that binds an inbound interface to an action that directs key engines 70 to discard packets that arrive on the inbound interface when executing the FPB.

Some instantiated FPBs 74 specify one or more rate limiters that includes one or more policer stages that each bind an action to a particular flow rate. When a packet flow exceeds the flow rate for a particular policer stage of a rate limiter, key engines 70 execute the corresponding bound action. FPB interface 44 also provides interface to set rate limiter stage flow rates or to bind an action to a rate limiter stage. For example, SNMP 36 may invoke FPB interface 44 to obtain a reference to a rate limiter of a particular one of FPBs 74. SNMP 36 may then use the reference to set a flow rate for a second stage of the rate limiter to a particular bandwidth. As another example, SNMP 36 may use the reference to bind the second stage to an action (identified in the one of FPDL programs 48 from which compiler 66 compiled the FPB) that directs key engines 70 to load balance traffic that exceeds the flow rate for the second stage. Some instantiated FPBs 74 specify one or more counters that may be instantiated within forwarding path 72 and manipulated by key engines 70 during the execution of actions bound to packet key values or flow rate values, for example. Primitives 76, such as lookup tables and lookup tree, along with rate limiters and counters are hereinafter collectively referred to as "forwarding path elements." However, forwarding path elements may include additional types of structures to carry out data plane 78B functionality listed above.

Daemons 14 using FPB interface 44 can in the described manner manage lookup and rate limiter operations by referencing high-level constructs of FPDL programs 48. In this way, the described techniques may simplify programming of forwarding path 72.

Figure 3:
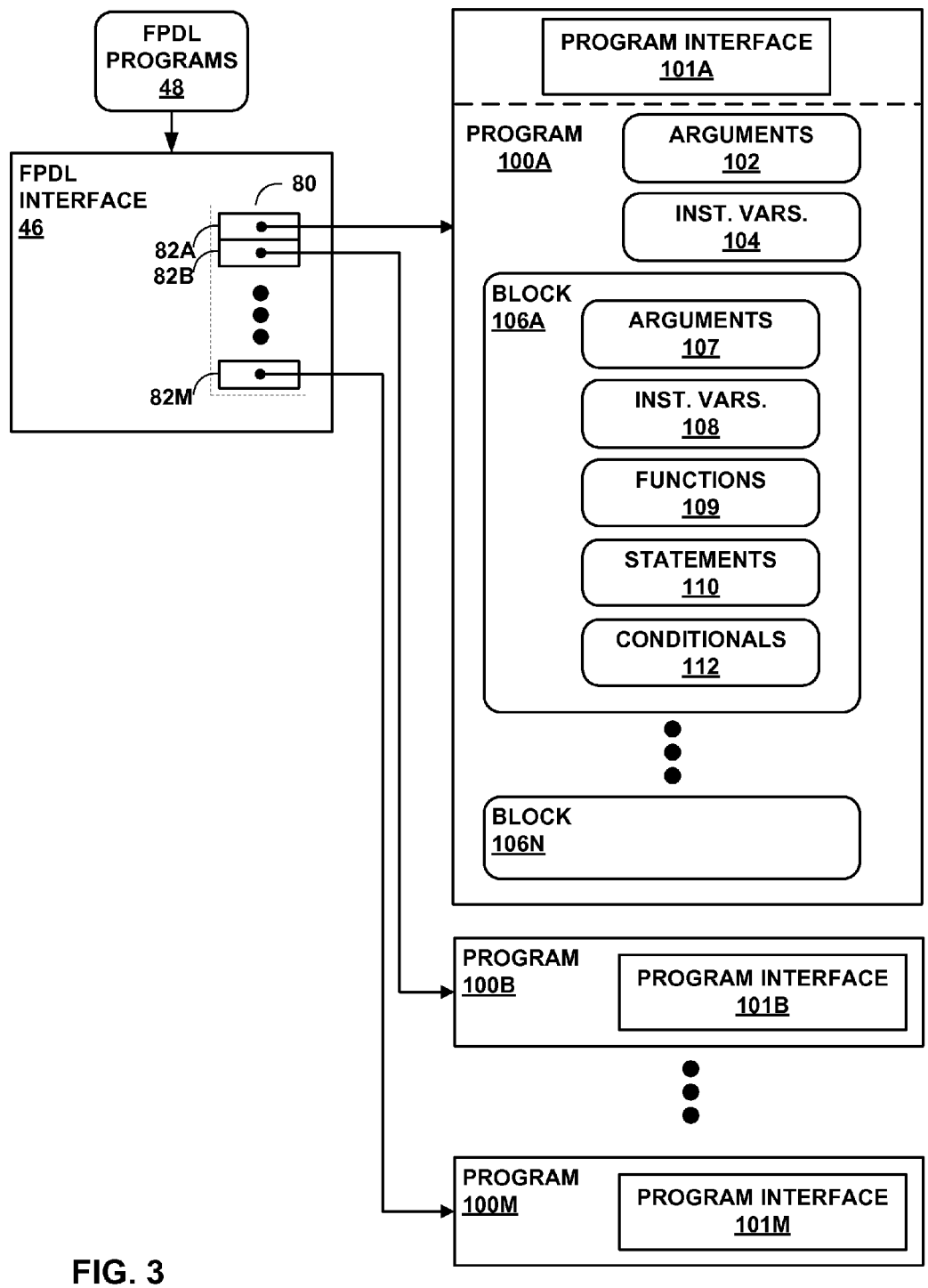
FIG. 3 is a block diagram illustrating an example FPDL interface for managing FPDL programs using the techniques described herein.

FIG. 3 is a block diagram illustrating FPDL interface 46 of FIG. 2 in further detail. FPDL interface 46 reads FPDL programs 48 from a computer-readable storage medium and pre-processes the programs to identify respective interface information for the programs. Program interface information for any of FPDL programs 48 may include the name of the program, names of program arguments, names of primitives and/or actions specified in the program, and names of rate limiters, for example. FPDL interface 46 assigns a unique identifier to each of programs 48 and generates one of FPDL description structures 82A-82M ("FPDL description structures 82") that each include the respective unique identifier (not shown), program interface information 101A-101M (illustrated as "program interfaces" 101A-101M), and program text 100A-100M (illustrated as "programs" 100A-100M). FPDL interface 46 stores references to FPDL description structures in FPDL identifier table 80, which allows FPB interface 44 to reference an FPDL description structure by a unique identifier for the program included within the FPDL description structure. Unique identifiers for FPDL description structures 82 may specify an index to FPDL identity table 80. FPDL interface 46 may store FPDL description structure 82 in memory until referenced by an FPB description structure. FPDL interface 46 may perform pre-processing of FPDL programs 48 when network device 10 powers on.

Example program text 100A illustrates forwarding path description language constructs that, when bound to received program arguments, compiled, and instantiated as FPBs 74 in forwarding path 72 of PFEs 20, direct packet processing by key engines 70 of PFEs 20. The forwarding path description language supports definition elements including scalars, such as integers and Booleans, structure definitions, type definitions (e.g., typedef), and bitfields. Program 100A includes global arguments 102, global instantiation variables 104 ("inst. vars. 104"), and a set of one or more blocks 106A-100N ("blocks 100"). Each of programs 100A has a unique name to enable the program to be referenced by FPB interface 44 to create FPB description structures and instantiate the program. In some instances, the forwarding path description language identifies a program variable using type program.

Global arguments 102 set forth argument variables that indicate to compiler 66 that the variable should be initialized externally via parameters supplied in an FPB description structure when the program is instantiated. In this way, global arguments 102 (together with block-local arguments 107) define an external interface to the program. As a result, FPDL interface 46 extracts the names of program argument variables to program interface information 101A during pre-processing. Global arguments 102 have block-global scope within program 100A and may therefore be referenced within any of blocks 106. In some instances, the forwarding path description language identifies arguments using variable type arg, making arg a valid storage class for the language. To declare a scalar that is an argument variable, for example, program 100A may include the text arg uint32 m_int;, where int32 specifies an unsigned 32-bit integer. Once initialized in compiler 66 compiling program 100A with externally supplied parameters, compiler 66 uses argument variables in a read-only manner to build an instance of the program.

Global instantiation variables 104 direct compiler 66 to instantiate a specified forwarding path element and allow that element to be referenced throughout blocks 106 of program 100A. Example instantiation variable types include counter, table, tree, and rate limiter. To declare a counter, for example, program 100A may include the text counter c;. Once initialized in compiler 66 compiling program 100A, compiler 66 uses instantiation variables in a read-only manner to build an instance of the program.

Blocks 106 represent elemental code containers of the forwarding path description language. Each of blocks 106 may contain variable declarations (e.g., arguments 107 and instantiation variables 108), statements 110, functions 109, and conditionals 112 that determine the instantiated forwarding path elements for a forwarding path block instance of a program as well as the operations of key engines 70 with respect to the forwarding path elements and program flow. Blocks 106 consolidate forwarding path description language code into easily readable sections and, because each block is named, allow the blocks to be referred to from within program 100A and also, via a reference obtained using FPB interface 44, external to program 100A.

By default, the first block 106A listed in program 100A is the default entry block for the program (i.e., the first block executed by key engines 70 upon initiation). Execution of compiled blocks by key engines 70 may "jump" from a first one of blocks 106 to a second one of blocks 106 only when the first block includes an explicit instruction to begin executing the second block. In this way, blocks 106 are similar to functions because they may be invoked and because they consolidate forwarding path description language code into sections. However, blocks 106 are not equivalent to functions because blocks do not return to an invoking block unless the invoked block includes an explicit instruction to return to the invoking block. In this way, blocks 106 have the properties of a labeled instruction that may be invoked by directing the thread to execute the labeled instruction (i.e., the first instruction within the block). To declare a block, for example, program 100A may include the text block blockA {/* block code */}.

Block-local argument variables 107 set forth argument variables that indicate to compiler 66 that the variable should be initialized externally via parameters supplied in an FPB description structure when the program is instantiated. Block-local instantiation variables 108 direct compiler 66 to instantiate a specified forwarding path element. Block-local argument variables 107 and instantiation variables 108 may be referenced only within block 106A. In other words, block-local variables do not have scope outside of the blocks in which they are declared.

The forwarding path description language may also provide syntax enabling assignments, parameterized functions, and compiler directives. Assignments may conform to standard C language syntax. Instantiation variables may not in general be assigned to because the variable only exists during instantiation. Instantiation variables may, however, be assigned to using instantiation constructor functions 109 for the variables. For example, block 106A may include the assignment instruction table foo_table=table (max: MAX_ENTRIES); that directs compiler 66 to instantiate the new table according to the instantiation constructor table ( ).

The forwarding path description language parameterizes functions using name:value pairs that provide values for named parameters and that can be listed in the function call in any order. Some functions may not be parameterized. Parameters may be mandatory or optional. Unsupplied values for optional parameters may cause compiler 66 to use an internal default value for the parameter. A parameter value may be an array of scalars or strings, for example. For instance, block 106A may include the assignment instruction bar foo_bar=bar(parameter2: value1, parameter1: [entry1, entry2]);. This example instruction invokes the bar function using value1 for parameter2 and an array of values for parameter1.

Compiler directives of the forwarding path description language modify compilation of compiler 66 according to provided parameters. For example, a compiler directive may indicate that program 100A is only available to run on any of a set of one or more ASIC architecture types listed in the directive. As a result, compiler 66 may decline to compile program 100A when compiler 66 executes on one of PFEs 20 that includes an ASIC chipset architecture type that is not listed in the compiler directive.

As described in further detail below, program flow within programs 100 is block-based. That is, due to the limited invocation context for key engines 70, key engine execution threads pass among labeled code blocks rather than among procedures. Functions 109 represent native (i.e., built-in) accessor functions that enable instantiation variables 108 (e.g., counters, rate limiters, and primitives) to be created and assigned according to function parameters. For example, as described above, block 106A may include the assignment instruction table foo_table=table(max: MAX_ENTRIES);

that directs compiler 66 to instantiate the new, empty table according to the accessor function table( ) of functions 109. Similar instantiation constructor may be presented by the FPDL for other forwarding path elements, such as trees, counters, and rate limiters, for example. In some instances, the instantiation constructor for tables may present a required parameter to define a number of entries for the table, and the instantiation constructor for rate limiters may present a required parameter to define a number of policer stages for the rate limiter.

Each of functions 109 presents an optional scope parameter that allows developers using the FPDL to manage the instantiation scope of the corresponding forwarding path element across separate instances of programs 100 installed to forwarding path 72. For example, program 100A may define a lookup table one of instantiation variables 108 as global. As a result, each one of FPBs 74 that is an instance of program 100A uses the same instance of the lookup table when executed by key engines 70. In other words, each instance of the lookup table is global and accessible by all instances of the program. As another example, a program 100A may define a local counter within a bound action also defined within program 100A. Each one of FPBs 74 that is an instance of program 100A is associated with a separate instance of the local counter. In other words, each local counter is local to an instance of the program and not accessible to other instances of the program. The scope of a forwarding path element defined in one of functions 109 for the element refers to the scope of the element among forwarding path block instances of a program (i.e., whether the element is shared), whereas block-local and block-global scope refers to a scope of variables within one of programs 100.

Key engines 70 execute statements 110 set forth within programs, such as program 100A. Compiler 66 generates and installs microcode for each of statements 110. In this sense, statements 110 instantiated in FPBs 74 define aspects of forwarding path logic for forwarding path 72. Statements 110 includes statements that control program flow, such as if (condition) { } else { } statements for evaluating conditions using comparisons, for instance. The following is an if( )else statement that conforms to an example FPDL:

if(result_read(field: iif-mismatch)==TRUE) {
      // Learn source interface
      goto vpls_sa_learn;
    } else {
      increment(counter: vpls_sa_age);
    }

In the above example, key engines 70 read an iif-mismatch field of a result buffer populated by executing a previous next hop, for instance. If the field value is true, the key engines 70 execute a vpls_sa_learn block that updates a VPLS L2 table for the network device with the source L2 address of the packet being processed. If the field value is false, the VPLS L2 table has already learned the L2 address and the key engines 70 increment a counter to age the VPLS L2 table entry for the source address.

Other example statements that control program flow for FPDL programs include goto, which references one of blocks 106 and causes key engines 70 to jump execution to the referenced block. A goto statement of statements 110 in block 106A may reference block 106A to facilitate recursive execution. A call statement of statements 110 invokes one of blocks 106 without parameters and without receiving a return value. A return statement of statements 110 in one of blocks 106 returns an execution thread to another one of blocks 106 that invoked the block with a call statement. In order the return, the return statement must be present. The call statement may be stacked among multiple blocks 106.

An exit statement of statements 110 causes packet forwarding engines 70 to execute code that is external to one of FPBs 74 instances of programs 100. The exit statement may reference a next hop reference, another one of FPBs 74, or other forwarding path reference type. A discard statement of statements 110 causes packet forwarding engines 70 to terminate packet processing for the packet currently being processed.

A lookup statement of statements 100 directs lookup functionality of forwarding path 72 by associating one or more possible actions with a lookup result for one of primitives 76 that is predicated upon a key value. In one example of a lookup statement, an item statement defines a template for items that may be instantiated within one of primitives 76 and bound to the one more actions defined by one or more action statements of the lookup statement. The action statements define per-action operations executed when a lookup operation identifies the matching item and performs the bound action. In addition, the item statement may include one or more instantiation variables and statements that apply to each item instantiated from the item statement template. These define per-item operations. A default statement within a lookup statement defines a default action for a lookup operation. When the lookup operation is unable to determine a matching item, key engines 70 execute the operations defined by the default statement. If no default is specified, key engines 70 may discard the packet being processed.

Daemons 14 may use FPB interface 44 to add items to one of primitives 76 and bind these items to actions named in the action statements for the lookup statement that references the primitive. FPB-PFE interface 64 instantiates added items by adding any forwarding path elements and microcode required by the item statement template for the lookup statement that references the primitive. Compiler 66 translates a lookup statement of statements 100 into a forwarding hardware lookup executable by key engines 70.

Rate-limiters of forwarding path 72 may be based on a series of cascaded stages. A rate-limiter( ) statement of statements 100 directs rate-limiting functionality of forwarding path 72 by associating one or more possible actions with a rate-limiter stage (e.g., a policer) that triggers when traffic flow exceeds the allowed bandwidth for the stage. When a rate-limiter stage triggers, key engines 70 execute the action bound to the rate-limiter stage. Daemons 14 may use FPB interface 44 to set allowable bandwidths for each rate-limiter stage and bind each rate-limiter stage to an action defined within a rate-limiter( ) statement of statements 100 in programs 100.

An increment( ) statement of statements 100 increments a counter defined as one of instantiation variables 104, 108 within programs 100. The counter may be supplied to the statement as a parameter. The following is an increment( ) statement that conforms to an example FPDL: increment (counter: discard_counter). A sample( ) statement of statements 100 directs keys engines 70 to sample the packet currently being processed. The sample class may be specified as a parameter, which may be supplied as one of arguments 102, 107. Sampling refers to a process of forwarding a copy of a packet to an external system, such as control unit 12, for processing. A packet that is designated to be sampled is processed normally according to forwarding path 72, but data plane 78B creates a copy of the packet (or portion of the packet) and forwards the copy to control plane 12 for further processing. The following is a sample( ) statement that conforms to an example FPDL: sample(class: myclass).

The statements packet_read( ) and packet_write( ) of statements 110 access packet header fields in the key buffers of key engines 70 for reading from and writing to header field values, respectively. The packet_read( ) statement is a function that returns the value of field name specified for the function and may thus be used for comparison evaluation, as in the following example:

```
if(packet_read(field: ip4.proto)==ICMP) {
  // Handle ICMP packet
}
```

In the above example, an FPB instance of one of programs 100 that includes these statements directs key engines 70 read the IPv4 protocol field of the packet header being processed from the associated key buffer for the key engine and determine whether the field has a value equal to the constant defined for ICMP. If the packet is an Internet Control Message Protocol (ICMP) packet, packet engines 70 process the packet as an ICMP packet, which may include trapping the packet to control plane 78A.

The statements result_read( ) and result_write( ) of statements 110 access fields of the result buffer associated with the executing one of key engines 70 to enable data passing between next hops within and external to FPBs 74. The result_read( ) statement is a function that returns the value of field name specified for the function and may thus be used for comparison evaluation, as in the following example:

```
if(result_read(field: iif-mismatch)==TRUE) {
  // Learn source address
}
```

In the above example, packet engines 70 read their associated result buffers to determine whether the packet currently being processed does not match the expected inbound interface, as determined by the operation of a previous next hop in the next hop chain that also includes one of FPBs 74 instantiated from a program 100 that defines the above example code.

Conditionals 112 may affect both execution by key engines 70 and compilation/instantiation by compiler 66. Key engines 70 evaluate conditionals 112 defined in programs 100 and direct the execution thread according to the outcome. The following example that conforms to an example FPDL program 100 redirects IPv4 fragments based on a key buffer field:

```
program fragment-redirect
{
  arg fpr_t service_fpr;
  arg fpr_t next_fpr;
  block fragment_input {
    if(packet_read(field: ip4.is_fragment)==TRUE) {
      exit service_fpr;
    } else {
      exit next_fpr;
    }
  }
}
```

By updating the argument variables of the above program, daemons 14 via FPB interface 44 may alter the forwarding path to prescribe subsequent forwarding path elements for the possible results of the conditional without requiring compiler 66 to recompile the program 100 and instantiate a new one of FPBs 74.

In addition, compiler 66 evaluates conditionals 112 in programs 100 that are dependent upon argument variables and compiles the programs according to arguments supplied by FPB interface 44. The following example that conforms to an example FPDL program 100 causes compiler 66 to instantiate, based on the supplied argument, only partial logic defined by the program:

```
program set_interface_type
{
  arg boolean vpls_is_pe;
  block vpls_input {
    if(vpls_is_pe) {
      packet_context.vpls_mesh_group=VPLS_PE_D_MESH;
    } else {
      packet_context.vpls_mesh_group=VPLS_CE_D_MESH;
    }
  }
}
```

By providing the appropriate argument variable value for the above program, FPB interface 44 causes compiler 66 to conditionally compile and instantiate one, but not the other, of the possible resulting instructions for the condition. If the VPLS is a provider edge interface, compiler 66 compiles the statement setting the VPLS mesh group to the default VPLS PE mesh group. Otherwise, compiler 66 compiles the statement setting the VPLS mesh group to the default VPLS CE mesh group. In this way, a single program may support multiple different modes for a forwarding path feature, as determined by arguments supplied to the PFEs 20.

The example program code provided above and throughout this disclosure is merely exemplary. Other program code grammars capable of facilitating the described techniques are also contemplated. In one example, program code, including the various blocks, arguments, instantiation and other variables, functions, statements, conditions, and arguments, may conform to the following language definition, which for illustrative purposes is in Backus-Naur Form (BNF):

```
/*
 * FPDL BNF
 */
grammar FPDL;
/*
 * Top level
 */
input:
  program+
;
/*
 * Overall syntax of program
 */
program:
  L_PROGRAM L_NAME L_BEGIN
  program_unit+
  L_END
;
/*
 * Declarations can be interspersed with blocks
 */
program_unit:
  block |
  declaration
;
/*
 * Overall block syntax
 */
block:
  L_BLOCK L_NAME
  compound_statement
;
```

```
compound_statement:
    L_BEGIN
    block_statement*
    L_END
    ;
/*
 * Statement
 *
 * We classify statements in two ways:
 * —control/vs. operation
 * —conditional vs. unconditional
 *
 * 'operation' means change packet-related state in
    some way.
 * 'control' involves branching (and not returning) to
    another block.
 *
 * This gives four possible types of statements:
 *
 * 1) unconditional_operation
 * 2) conditional_operation
 * 3) conditional_control
 * 4) unconditional_control
 *
 */
block_statement:
    declaration |
    unconditional_statement |
    if_else
    ;
unconditional_statement:
    unconditional_operation |
    unconditional_control
    ;
unconditional_operation:
    pfe_write |
    increment_statement |
    lookup_or_rate_limit
    ;
lookup_or_rate_limit:
    lookup_statement |
    rate_limit_statement
    ;
goto_statement:
    L_GOTO L_NAME ';'
    ;
/*
 * Lookups
 *
 * Basic lookup syntax. This currently defines three
    types of lookup (itables, trees and flow)
 * Extensible to match different lookup requirements
 */
lookup_statement:
    L_LOOKUP '(' lookup_arguments ')' L_BEGIN
        lookup_entry+
    L_END
    ;
lookup_arguments:
    table_type L_COLON L_NAME ',' lookup_key
    ;
table_type:
    L_ITABLE |
    L_TREE |
    L_FLOW
    ;
lookup_key:
    L_KEY L_COLON L_HIER_NAME
    ;
lookup_entry:
    lookup_item |
    action
    ;
lookup_item:
    L_ITEM
    compound_statement
    ;
action:
    L_ACTION L_NAME compound_statement
    ;
/*
 * Counter increment action statement
 */
increment_statement:
    L_INCREMENT '(' L_COUNTER L_COLON
        L_NAME ')' ';'
    ;
/*
 * Rate-limited (e.g. policer) charge action statement
 */
rate_limit_statement:
    L_RATE_LIMIT '(' L_RATE_LIMITER L_COLON
        L_NAME ')'
    L_BEGIN
    action+
    L_END
    ;
/*
 * Variable declarations and storage/type definitions
 */
declaration:
    storage_type data_type L_NAME initialization ';'
    ;
storage_type:
    L_ARGUMENT |
    L_PFE
    ;
data_type:
    L_NAME |
    L_BOOLEAN |
    L_UCHAR |
    L_USHORT |
    L_ULONG |
    L_FPR |
    L_LIST |
    L_COUNTER_T |
    L_RATE_LIMITER_T |
    L_ITABLE_T |
    L_TREE_T |
    L_FLOW_T |
    ;
/*
 * Variable initialization.
 */
initialization:
    L_EQ initialization_type '(' scope_def initialization-
        _list ')'
    /* optional */
    ;
initialization_type:
    L_COUNTER |
    L_RATE_LIMITER |
    L_ITABLE |
    L_TREE |
```

```
L_FLOW |
;
initialization_list:
    initialization_argument+|
    /* optional */
;
initialization_argument:
    L_NAME L_COLON L_NUMBER |
    L_NAME L_COLON L_NAME
;
scope_def:
    L_SCOPE L_COLON scope_level comma_or_nothing
        |
;
comma_or_nothing:
    ',' |
    /* nothing */
;
scope_level:
    L_GLOBAL |
    L_LOCAL
;
pfe_field_name:
    L_NAME |
    L_HIER_NAME
;
identifier:
    L_NAME
;
primary_expression:
    identifier |
    base_expression
;
base_expression:
    constant
;
constant:
    L_NUMBER
;
/*
 * Conditional expression syntax
 */
relation:
    L_GT |
    L_NE |
    L_EQUIV |
    L_LE |
    L_GE |
    L_LT
;
predicate_expression:
    var_expression relation var_expression
;
primary_conditional_expression:
    L_LOGICAL_NOT predicate_expression |
    predicate_expression
    '(' conditional_expression ')' |
    L_LOGICAL_NOT '(' conditional_expression ')' |
    base_expression
;
logical_and_expression:
    (primary_conditional_expression) (L_LOGICA-
        L_AND primary_conditional_expression)*
;
conditional_expression:
    (logical_and_expression) (L_LOGICAL_OR logica-
        l_and_expression)*
;
if_clause:
    L_IF '(' conditional_expression ')'
;
if_else:
    if_clause compound_statement |
    if_clause compound_statement L_ELSE if_else |
    if_clause compound_statement L_ELSE compound-
        _statement
;
unconditional_control:
    L_EXIT L_NAME ';' |
    L_DISCARD ';' |
    goto_statement
;
var_expr:
    primary_expression |
    pfe_read
;
/*
 * Basic PFE access statements
 */
pfe_read:
    pfe_read_type '(' L_FIELD L_COLON pfe_field-
        _name ')'
;
pfe_read_type:
    L_PACKET_READ |
    L_RESULT_READ
;
pfe_write:
    pfe_write_type '(' L_FIELD L_COLON pfe_field-
        _name ',' L_VALUE L_COLON primary_expres-
        sion ')' ';'
;
pfe_write_type:
    L_PACKET_WRITE |
    L_RESULT_WRITE
;
/*
 * FPDL token dictionary
 */
L_BEGIN: '{';
L_END: '}';
L_DOT: '.';
L_AND: '&';
L_LOGICAL_AND: '&&';
L_OR: '|';
L_LOGICAL_OR: '||';
L_XOR: '^';
L_NE: '!=';
L_LOGICAL_NOT: '!';
L_EQUIV: '==';
L_EQ: '=';
L_IF: 'if';
L_ELSE: 'else';
L_GE: '>=';
L_GT: '>';
L_LE: '<=';
L_LT: '<';
L_COLON: ':';
L_BLOCK: 'block';
L_GOTO: 'goto';
L_EXIT: 'exit';
```

L_DISCARD: 'discard';
L_TREE: 'tree';
L_TREE_T: 'tree_t';
L_ITABLE: 'itable';
L_ITABLE_T: 'itable_t';
L_RATE_LIMITER: 'rate_limiter';
L_RATE_LIMITER_T: 'rate_limiter_t';
L_RATE_LIMIT: 'rate_limit';
L_COUNTER: 'counter';
L_COUNTER_T: 'counter_t';
L_SAMPLER: 'sampler';
L_LOOKUP: 'lookup';
L_ARGUMENT: 'arg';
L_PFE: 'pfe';
L_PROGRAM: 'program';
L_PACKET_READ: 'packet_read';
L_PACKET_WRITE: 'packet_write';
L_RESULT_READ: 'result_read';
L_RESULT_WRITE: 'result_write';
L_FIELD: 'field';
L_VALUE: 'value';
L_INCREMENT: 'increment';
L_KEY: 'key';
L_ITEM: 'item';
L_ACTION: 'action';
L_SCOPE: 'scope';
L_GLOBAL: 'global';
L_LOCAL: 'local';
L_UCHAR: 'u_int8_t';
L_BOOLEAN: 'boolean_t';
L_USHORT: 'u_int16_t';
L_ULONG: 'u_int32_t';
L_FPR: 'fpr_t';
L_FLOW: 'flow';
L_FLOW_T: 'flow_t';
L_LIST: 'list_t';
fragment LETTER: 'a' ..'z'|'A' ..'Z'|'_';
fragment DIGIT: '0' .. '9';
L_NAME: LETTER (LETTER|DIGIT)*;
L_NUMBER: DIGIT+;
L_HIER_NAME: LETTER (LETTER|DIGIT|'.')*(LETTER|DIGIT)*;
/*
 * End FPDL grammar
 */

Figure 4:
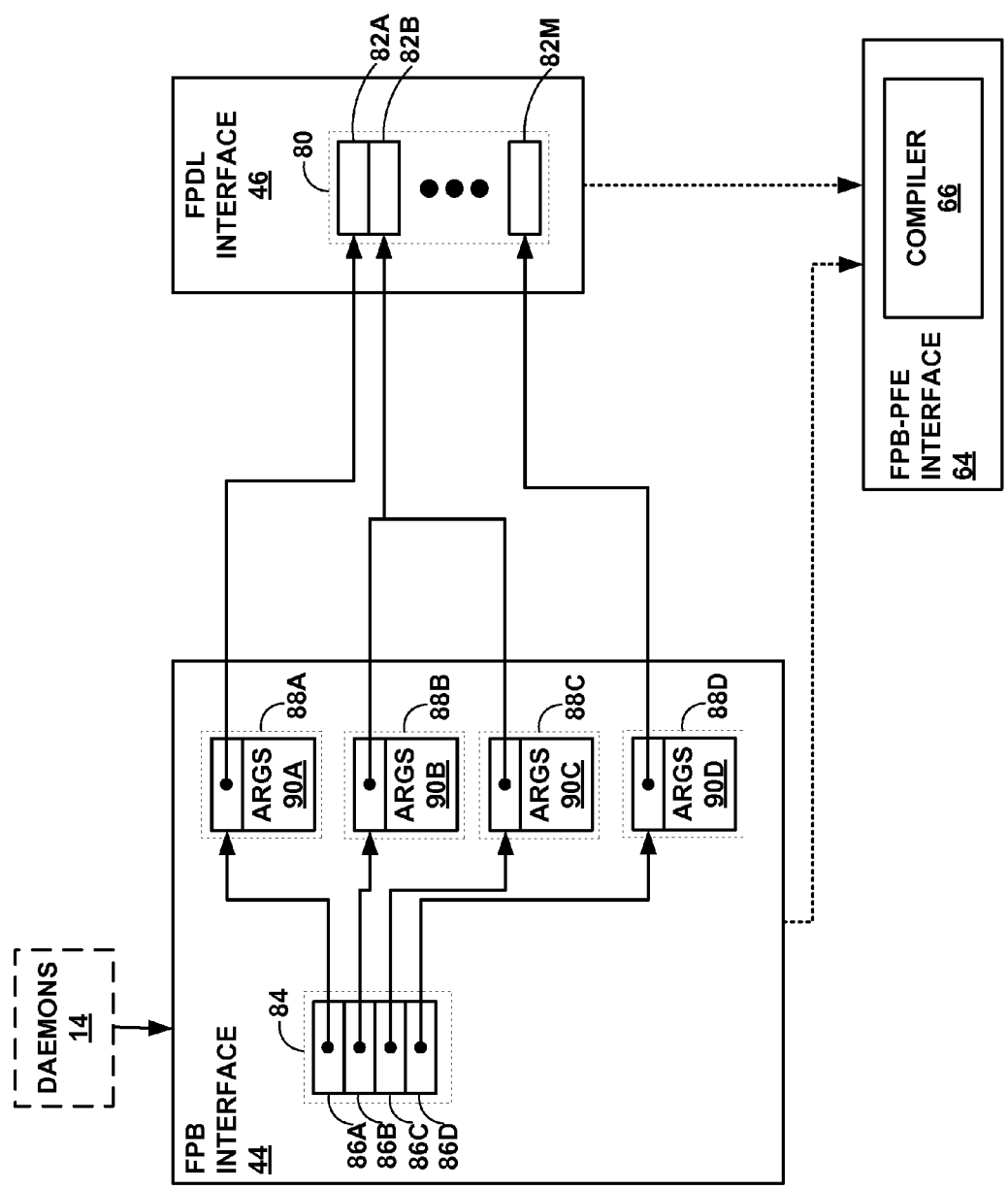
FIG. 4 is a block diagram illustrating FPB interface for creating forwarding structures in a forwarding path of the network device using the techniques described herein.

FIG. 4 is a block diagram illustrating FPB interface 44 of FIG. 2 in further detail. FPB interface 44 presents FPDL interface 46 to daemons 14 to enable the daemons to select an FPDL program and bind it to an initial set of arguments 90A-90D ("arguments 90") in one of FPB description structures 88A-88D ("FPB description structures 88"). FPB interface assigns each of FPB description structures 88 a unique, system-wide identifier that enables PFEs 20 to distinguish FPBs 74 from one another and from next hops, for example. FPB interface 44 stores references to FPB description structures 88 in respective FPB table identifier entries 86A-86D of FPB identifier table 84. Unique identifiers for FPB description structures 88 may specify an index to FPB identifier table 84. Each of arguments 90 is a set of zero or more arguments for the one of FPDL description structures 82 of FPDL interface 46 referenced by the FPB description structure that includes the arguments. Arguments 90A, for example, may contain values for argument variables of an FPDL program. Each of FPB description structures 88 thus contains a reference to a textual FPDL program and a respective set of arguments 90 required to instantiate the program.

FPB interface 44 sends FPB description structures 88 and FPDL interface 46 sends FPDL description structures 82 to PFEs 20 for compilation by compiler 66 in accordance with the respective arguments 90 founds within the FPB description structures. FPB-PFE interface 64 installs the compiled instance of the corresponding program to forwarding path 72 as one of FPBs 74.

Multiple FPB description structures 88 may reference a single one of FPDL description structures 82. In the illustrated example, FPB description structures 88B, 88C reference FPDL description structure 82B. As a result, control unit 12 may install multiple different instances of the single FPDL program reference by FPDL description structure 82B, with each instance exhibiting different behavior according to the particular parameters of FPB description structures 88B, 88C. In addition, FPDL interface 46 need only send one copy of each of FPDL description structures 82 to each of the PFEs 20 for compilation. These instances may be reused by compiler 66 to support multiple FPB description structures 88 that reference the instances.

In some aspects, compiler 66 compiles FPDL program text received in FPDL description structures 82 to platform-independent intermediate code object (or representation) that retains placeholders for arguments received by compiler 66 in FPB description structures 88. When compiler 66 receives a new or updated one of FPB description structures 88, the compiler combines the intermediate code and the respective arguments 90 the FPB description structure to generate a new instance of the FPB for installation by FPB-PFE interface 64 to FPBs 74.

Figure 5:
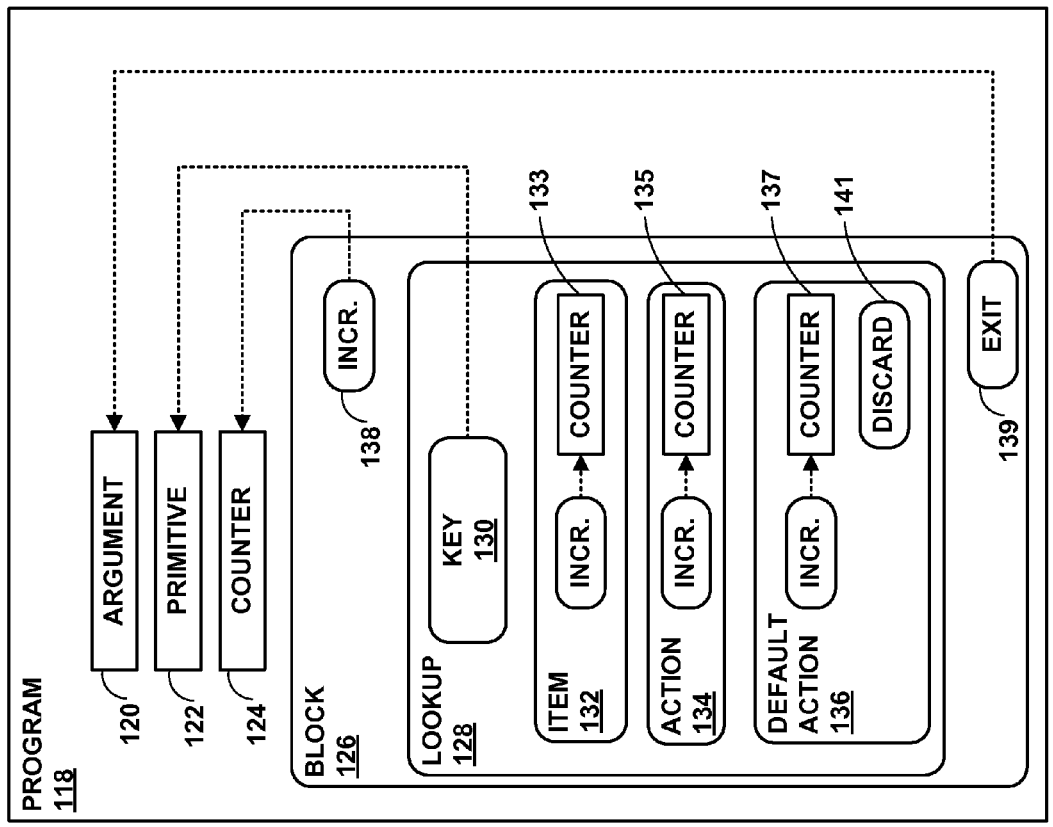
FIG. 5 is a block diagram illustrating an example program that conforms to a high-level forwarding path description language that accords with the principles of this disclosure.

FIG. 5 is a block diagram illustrating an example program 118 that conforms to a high-level forwarding path description language that accords with the principles of this disclosure. Program 118 includes argument variable 120, primitive 122, counter 124, and block 126. Primitive 122 may represent a lookup table or lookup tree, for example, and may cause a device that compiles program 118 to create a corresponding primitive in forwarding hardware.

Block 126 includes increment statement 138, lookup statement 128, and exit statement 139. During packet processing, key engines 70 execute block 126 to first execute increment statement 138 to increment counter 124, which counts every packet handled by program 118.

Lookup statement 128 defines a lookup template by which FPB interface may bind forwarding path actions to lookup items 132 in primitive 122. Items refer to individual entries within a lookup primitive that corresponds to a possible value for a field or other property of a packet key. An action is a section of code executable by key engines when an item to which the action is bound is matched during a lookup operation. Daemons 14 may add, modify, and delete item entries and item-action bindings using FPB interface 44.

The example lookup statement 128 defines an item template 132 that specifies a counter 133 and an increment statement that, when compiled and executed, increments counter 133. As a result, each item for primitive 122 is associated with a counter that key engines 70 increment when the item matches the packet being processed. Lookup statement 128 also defines action 134 and default action 136. FPB interface 44 binds each item entry added to primitive 122 to either action 134 or default action 136. In various examples, lookup statement 128 may define any number of actions. Default action 136 provides default code that packet engines execute for packet key values that do not match any of the items added to the primitive defined by primitive 122. In addition, FPB interface 44 may bind added item entries to default action 136. Actions 134 and default action 136 include respective increment statements that, when compiled and executed, increment respective counters 135, 137. As a result, program 118 tracks the number of packets processed according to each of the actions. In addition, default action 136 includes discard statement 141 that, when compiled and executed, directs key engines to discard the packet currently being processed.

Key engines 70 execute lookup statement 128 by keying key 130, defined in lookup statement 128, to the primitive identified by primitive 122. Lookup statement 128 thus expresses a complex forwarding path lookup using a simple syntax provided by the forwarding path definition language. After executing the lookup statement 128, exit statement 139 directs key engines 70 to proceed to the forwarding path reference provided by FPB interface 44 for argument variable 120.

The following is program test, an example instance of program 118:

```
program test {
    arg fpr nextfpr;
    itable test_table=table(max: TEST_ENTRIES_MAX);
    counter test_inputs=counter(scope: global);
    block test_input {
        increment(counter: test_inputs);
        lookup(table: test_itable, key: packet_read(field: iif)) {
            item {
                counter test_items=counter(scope: local);
                increment(counter: test_items);
            }
            action test_accept {
                counter test_accepts=counter(scope: local);
                increment(counter: test_accepts);
            }
            action default {
                counter test_discards=counter(scope: local);
                increment(counter: test_discards);
                discard;
            }
        }
        exit nextfpr;
    }
}
```

In the above example, nextfpr represents argument 120, test_table is a table that represents primitive 122, and test_items represents counter 124. Key 130 of lookup statement 128 is parameterized using an iif field of the packet key, and the lookup primitive is for lookup statement 128 test_itable. Counters test_items, test_accepts, and test_discards represent counters 133, 135, and 137, respectively. Lookup operation 128 defines action 134 (named test_accept) and default action 136 (named default).

In operation, daemons 14 bind actions to items using FPB interface 44 by referring to action names and to primitive names. For example, FPB interface 44 may define methods fpb_table *fpb_table_find_by_name(fpb *fpb, char *table_name) and void fpb_table_add(fpb_table *table, int index, char *action_name). Daemons 14 may invoke FPB interface 44 with the names defined in FPDL program test in the above example. For example, RPD 34 may obtain a table pointer value, table_t, to primitive 122 by executing table_t=fpb_table_find_by_name (fpb_1, "test_table"), and may subsequently add items to table_t and bind the items to actions by executing fpb_table_add. For example, RPD 34 may add an item for packet property value 10 and bind the item to action 134 by executing fpb_table_add (table_t, 10, "test_accept"). FPB interface 44 may define similar interface methods for lookup tree primitives and for rate limiters.

As a result, daemons executing in the control plane of a network device can control lookups in the forwarding path without requiring programs in the data plane to be recompiled and without requiring new programs to be deployed to the data plane.

Figure 6:
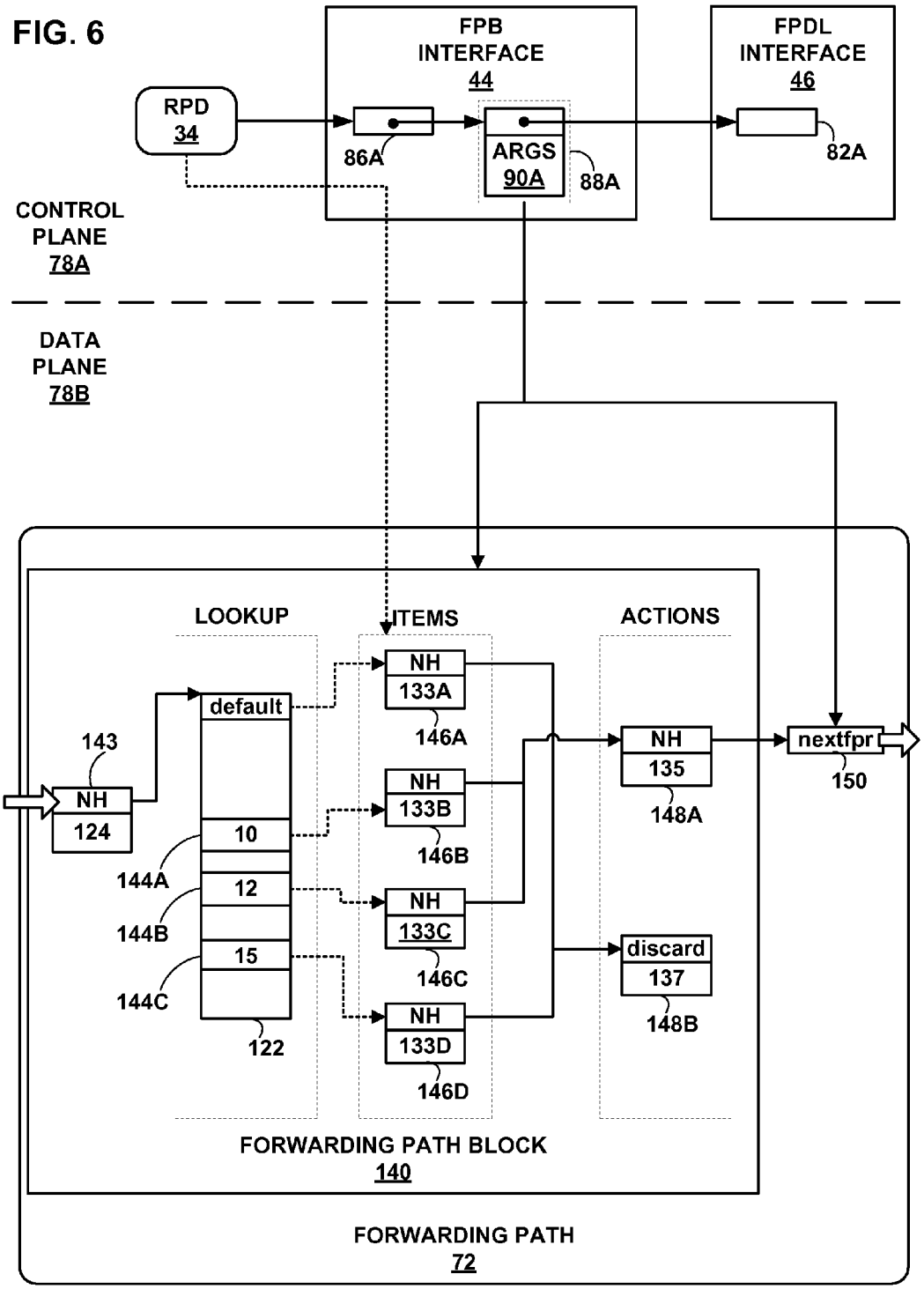
FIG. 6 is a block diagram illustrating an example forwarding structure installed to a forwarding path of a network device using unified forwarding structure installation and configuration techniques described in this disclosure.

FIG. 6 is a block diagram illustrating a representation of an example forwarding path block 140 ("FPB 140") installed under direction by RPD 34 via FPB interface 44 and FPDL interface 46 to forwarding path 72 of PFE 20A in accordance with unified forwarding path block installation and configuration techniques described in this disclosure. Forwarding path block 140 represents an instance of program 118 of FIG. 5. In this example implementation, FPB 140 is implemented using next hops chained together in accordance with the FPDL code of the corresponding program and in accordance with item-action binding in lookup table 145, a lookup primitive.

RPD 34 invokes FPB interface 44 to create FPB description structure 88A, referenced by FPB table identifier entry 86A, to include arguments 90A for the program referenced by FPDL description structure 82A. FPB interface 44 sends FPB description structure 88A to PFE 20A, which compiles the referenced program and arguments 90A to FPB 140 and installs FPB 140 to forwarding path 72. Arguments 90A include a value for the argument variable nextfpr 150. In addition, RPD invokes FPB interface 44 to add items 146A-146D to primitive 122 and bind the items to one of actions 148A, 148B ("actions 148") defined for the lookup operation.

During execution, packet engines 70 enter FPB 140 at next hop 143, which includes microcode to cause the packet engines increment counter 124. Next hop 143 chains to the lookup operation for primitive 122 (here illustrated as a table). Primitive 122 includes item entries 144A, 144B, and 144C for respective packet property values (e.g., key values) 10, 12, and 15. The lookup operation directs execution threads of packet engines 70 to the respective item structure 146A-146D ("items 146") for the matching packet property value. In the illustrated example, items 146 are each an instance of item template 132 of FIG. 5 and are each implemented as next hops. For example, packet property value 10 directs packet engines 70 to item 146B for packet property value 10 specified by item entry 144B. The next hop of item 146B causes the packet engines to increment counter 133B for the item. In this way, every one of items 146 has an associated counter that counts packets that match the packet property value corresponding to the item.

Each of items 146 is bound, by operation of FPB interface 44, to one of actions 148. For example, item 146B is bound to action 148A. Action 148B represents an instantiation of default action 136 defined in program 118 of FIG. 5, and directs packet engines 70 to increment counter 137 (the discard counter) and to discard the packet being processed. Action 148A represents an instantiation of action 134 defined by program 118 of FIG. 5, and directs packet engines 70 to increment counter 135 according to the next hop. Completion of action 148A directs packet engines 70 to proceed to the forwarding path reference (e.g., a next hop location) defined by the value for argument variable nextfpr 150.

Figure 7:
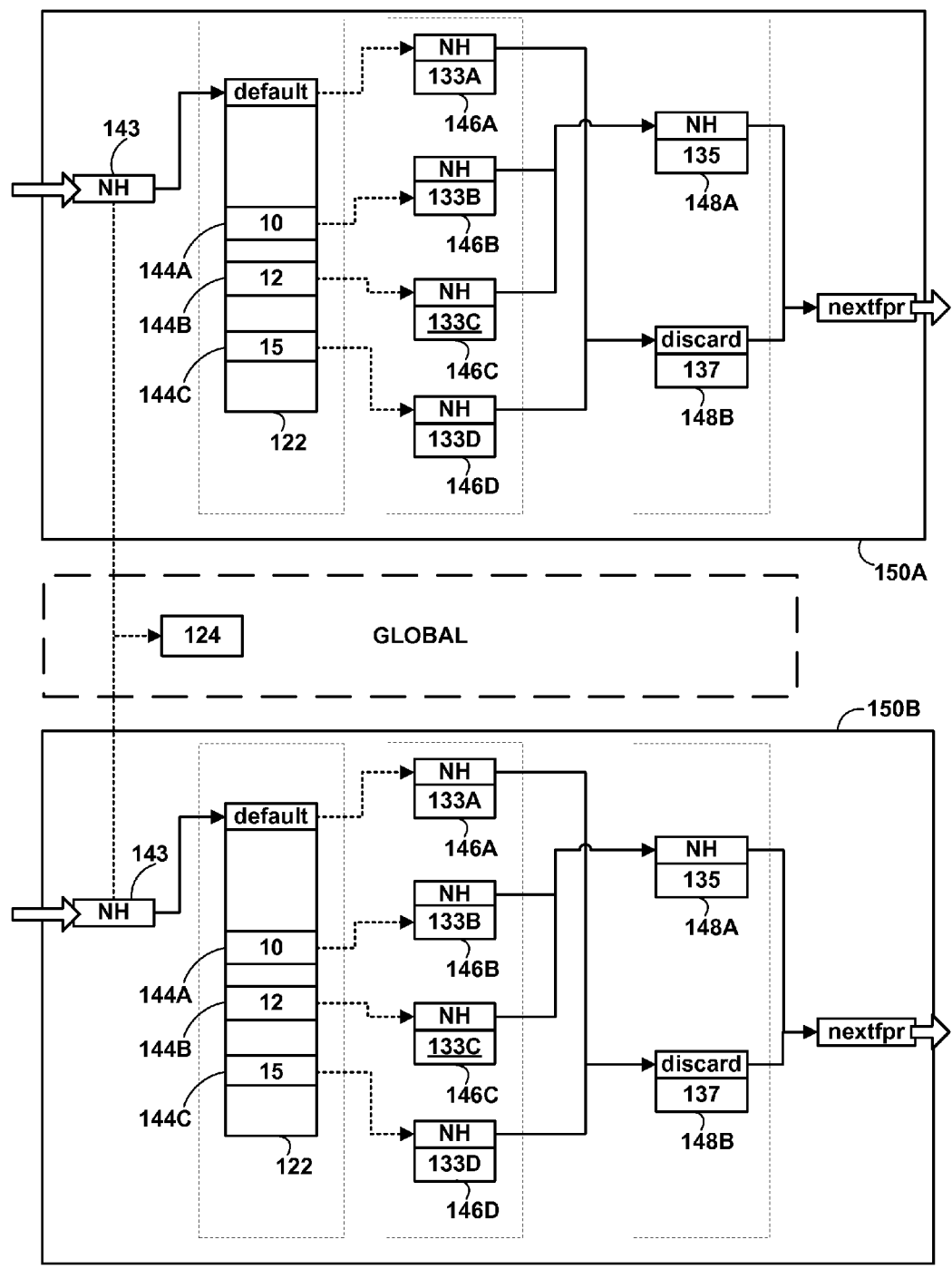
FIG. 7 is a block diagram illustrating example forwarding structures having installation variables of diverse scope in accordance with the described techniques.

FIG. 7 is a block diagram illustrating a representation of example forwarding path blocks 150A, 150B ("FPBs 150") having installation variables of diverse scope and installed to forwarding path 72 of PFE 20A in accordance with the described techniques. Each of FPBs 150 represents an instance of program 118 of FIG. 5.

Functions that conform to a forwarding path description language as described herein present an optional scope parameter that allows developers using the FPDL to manage the instantiation scope of the corresponding forwarding path element across separate instances of programs installed to forwarding path 72. A globally scoped variable is shared among all instance of programs, while new instances locally scoped variables are created for each instance of programs. In the case of globally scoped variables, the PFE-FPB interface 64 creates the instance of the variable when installing the first instance of a program. PFE-FPB interface 64 configures subsequent instances of the program to use the previously allocated instance of the variable. In instances where every variable for a program is a local variable, PFE-FPB interface 64 instantiates every instance of the program as a complete copy of all variables. In other words, the program defines a template that may be reproduced and installed to forwarding path 72.

In the illustrated example, a counter that instantiates counter 124 is parameterized using a global scope value to indicate that the counter is a global counter shared among various instances of program 118, including FPBs 150. In one example, program 118 instantiates counter 124 according to the following instruction: counter foo_counter=counter (scope: global);. Next hops 143 of each of FPBs 150 indirectly reference (shown as dashed lines) counter 124 to increment the counter during packet processing. In various examples, any of the illustrated variables may be declared global to cause FPBs 150 to share the instance of such variables, including primitive 122, counters 146, counter 135, and counter 137 of respective FPBs 150. A globally scoped primitive 122 may enable daemons 14 to instantiate FPBs 150 to share a single lookup table, for example, simplifying management of the lookup table and ensuring consistency across FPBs 150. Items 146 added to primitive 122, however, are still bound in this example to only one of FPB 150. As a result, execution threads of packet engines 70 may jump between FPBs 150. For example, packet engine 70A may begin executing FPB 150A, lookup one of items 146 instantiated within FPB 150B, and thus transfer the execution thread to the next hop for the identified item within FPB 150B.

Figure 8A:
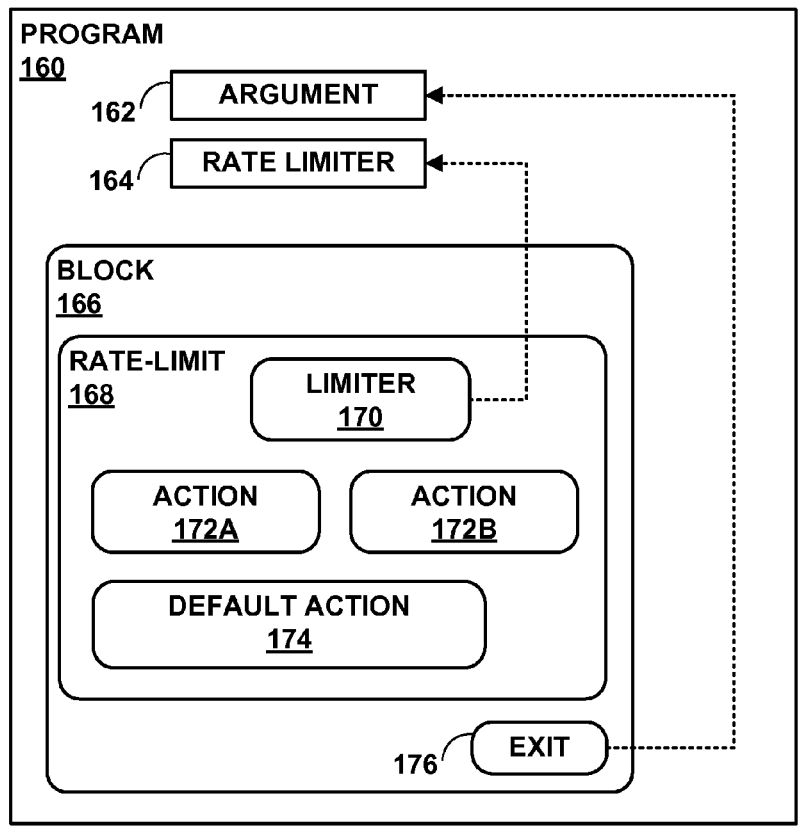
FIG. 8A is a block diagram illustrating an example program that conforms to a high-level forwarding path description language that accords with the principles of this disclosure.

FIG. 8A is a block diagram illustrating an example program 160 that conforms to a high-level forwarding path description language that accords with the principles of this disclosure. Program 160 defines a rate limiter instantiation variable 164 ("rate limiter 164") and includes rate-limit statement 168 to define actions 172A, 172B, and default action 174 that may be bound to rate limiter stages (e.g., individual policers of a rate limiter). Rate-limit statement 168 is parameterized using a rate limiter instantiation variable, in this example, rate limiter 164. A rate limiter function specifies the number of stages for rate limiter 164. In one example, program 160 instantiates rate limiter 164 according to the following instruction: rate_limiter test_limiter=rate_limiter (stages: 2);. In this example, the rate limiter function specifies two stages. When packet flow bandwidth exceeds a rate parameter value for one of the rate limiter stages, packet engines 70 execute the one of actions 172 or default action 174 bound to the stage having the exceeded rate parameter value. Default action 174 also provides the action for packet that belong to packet flows that do not exceed the rate parameter values of any stages of rate limiter 164. Exit statement 176 directs key engines 70 to proceed to the forwarding path reference provided by FPB interface 44 for argument variable 162 also defined in program 160.

Figure 8B:
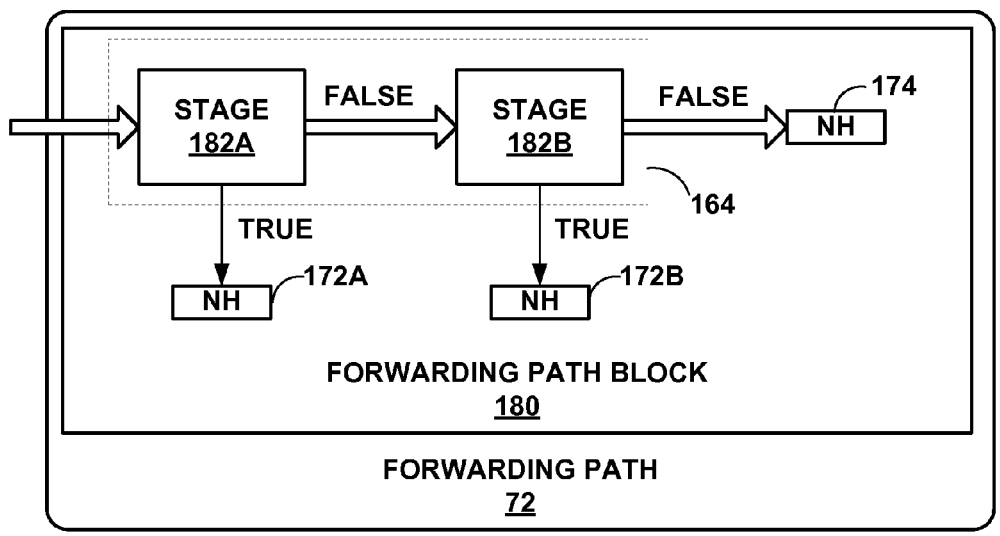
FIG. 8B is a block diagram illustrating an example forwarding structure that is an instance of an FPDL program.

FIG. 8B is a block diagram illustrating an example forwarding path block 180 ("FPB 180") that is an instance of program 160 installed to forwarding path 72. FPB 180 includes stages 182A, 182B ("stages 182") that each police packet flows according to a rate parameter value for the stage to implement rate limiter 164. Daemons 14 invoke FPB interface 44 to bind actions defined in program 160 to stages 182 and to set rate parameter values for stages 182. In one example, FPB interface 44 may define methods fpb_rate_limiter *fpb_rate_limiter_lookup(fpb *fpb, char *limiter_name) and void fpb_rate_limiter_stage_set(fpb_rate_limiter *limiter, int stage_index, int stage_bandwidth, char *action_name), where limiter_name is a parameter for a variable name of rate limiter 164 in program 160 and action_name is a parameter for names of actions 172, default action 174 defined in rate-limit statement 168 of program 160.

Packet flows arrive at stage 182A, which determines whether the packet flow bandwidth exceeds the rate parameter value for stage 182A. If so, packet engines 70 execute action 172A (here implemented as a next hop) bound to stage 182A by operation of FPB interface 44. If not, stage 182B determines whether the packet flow bandwidth exceeds the rate parameter value for stage 182B. If so, packet engines 70 execute action 172B (here implemented as a next hop) bound to stage 182B by operation of FPB interface 44. If not, packet engines 70 execute default action 174 (here implemented as a next hop). Each of stages 182 may each represent a hardware policer within an ASIC of a packet forwarding engine.

Figure 9:
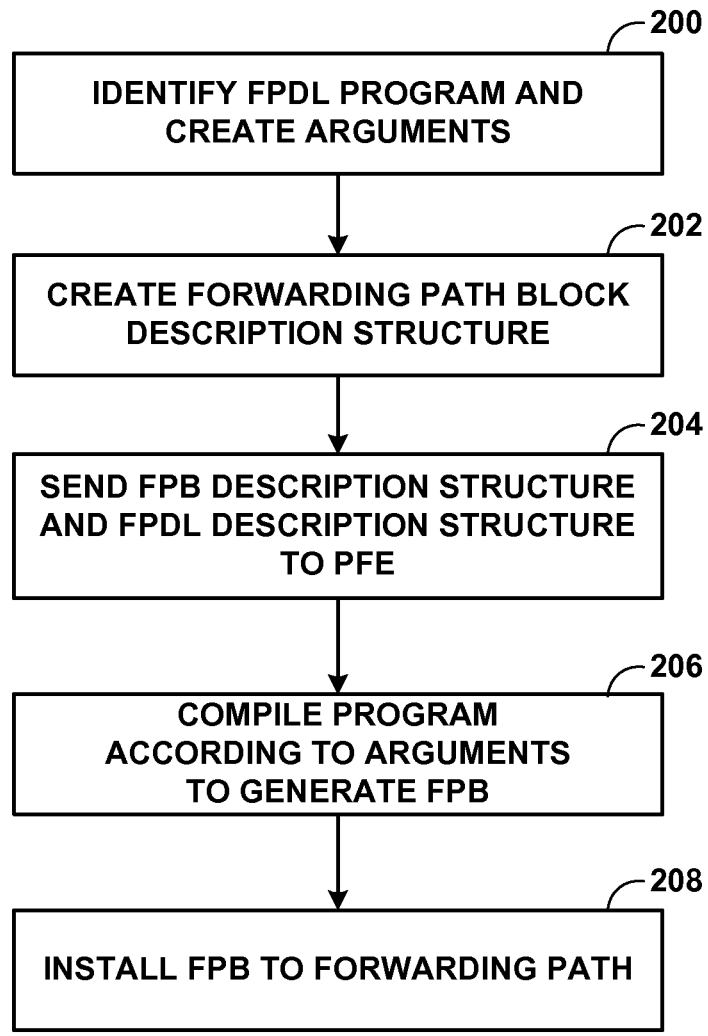
FIG. 9 is a flowchart illustrating an example mode of operation for a network device to create forwarding structures using techniques described in this disclosure.

FIG. 9 is a flowchart illustrating an example mode of operation for control unit 12 and PFE 20A of FIG. 2 to create forwarding structures using techniques described in this disclosure. Initially, one of daemons 14 identifies an FPDL program to instantiate using the FPDL program name and also creates an argument set with values for arguments exposed in a program interface for the FPDL program (200). Daemons 14 then invoke FPB interface 44 to create a forwarding path block description structure that includes a reference to the identified program (e.g., an FPDL description structure) and the set of argument values (202). FPB interface 44 may provide the following methods for creation, management, and deletion of forwarding path blocks:

fpb *fpb_create(char *fpdl_name, char *pfe_name, fpb_args *_fpb_args);
void fpb_delete(fpb *_fpb);
fpr fpb_get_fpr(fpb *_fpb);
fpb *fpb_lookup(fpb_id_fpb_id);

The method fpb_create creates and returns a reference to a new forwarding path block given a program name, a reference name for the one of PFEs 20 on which to create the forwarding path block, and a set of arguments. fpb_get_fpr returns a forwarding path reference that may be embedded within other forwarding path blocks as a value for an argument variable, for example. In this way, daemons 14 may chain together multiple forwarding path blocks 74 within forwarding path 72.

Once daemons 14 create an FPB description structure, FPB interface 44 sends the FPB description structure to PFE-FPB interface 64 and directs FPDL interface 46 to send the FPDL description structure for the referenced program to PFE-FPB interface 64 (204). Compiler 66 compiles the referenced program according to the set of arguments within the received FPB description structure to generate a new forwarding path block (206). PFE-FPB interface 64 then installs the new forwarding path block to forwarding path 72 as one of FPBs 74 (208).

Figure 10:
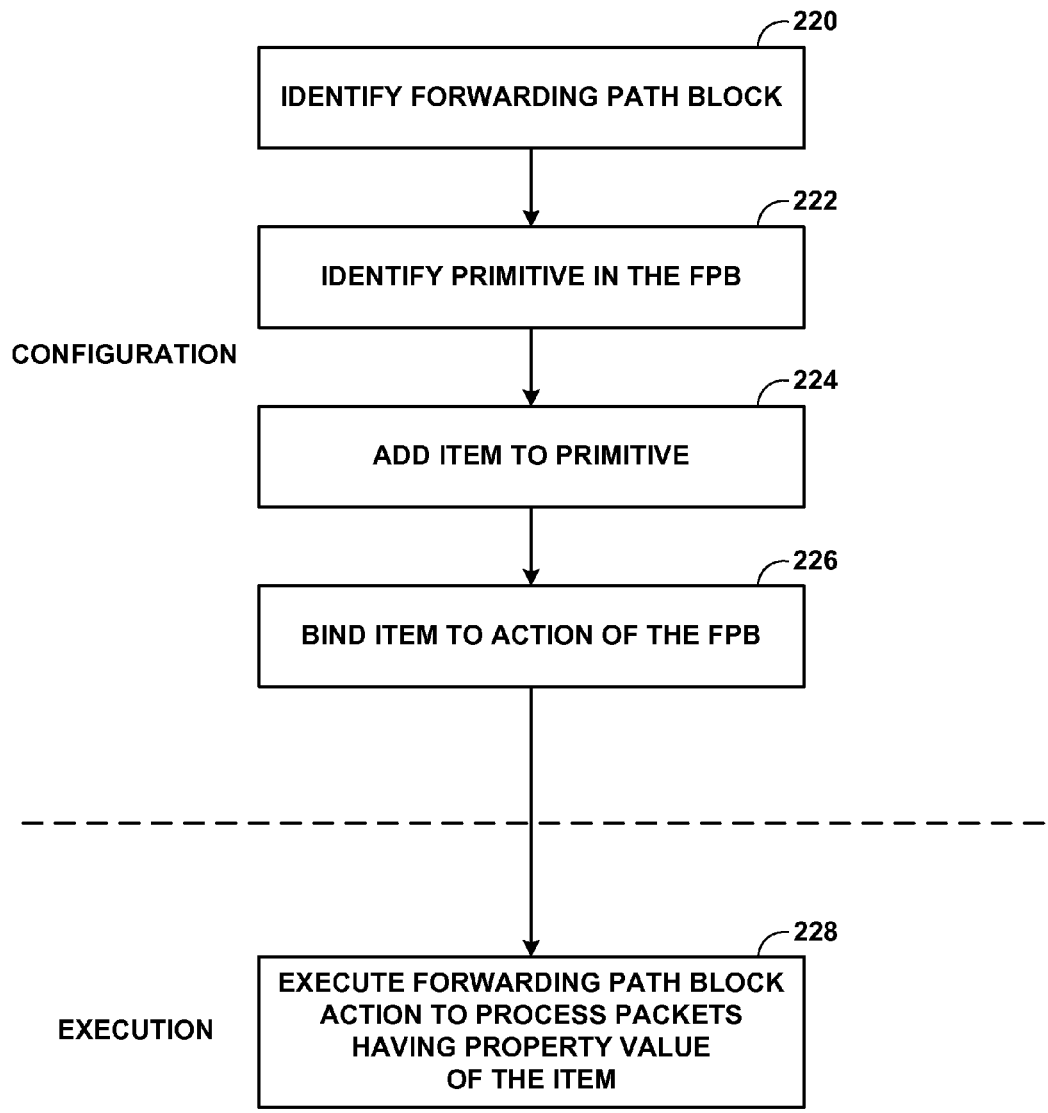
FIG. 10 is a flowchart illustrating an example mode of operation for a network device to populate a lookup primitive with items using techniques described in this disclosure.

FIG. 10 is a flowchart illustrating an example mode of operation for control unit 12 and PFE 20A of FIG. 2 to populate a lookup primitive with items using techniques described in this disclosure. One of daemons 14 identifies a forwarding path block in FPBs 74 that references one of primitive 76 to perform a lookup operation (220). The daemon may, for example, maintain a reference to the forwarding path block returned upon invoking FPB interface 44 or obtain a reference to the forwarding path block by providing an FPB identifier to FPB interface 44. The daemon next identifies a primitive name in the identified forwarding path block that is defined as a variable name in the program for the forwarding path block (222). The daemon invokes FPB interface 44 to add an item for a particular lookup value for the identified primitive (224). In addition, the daemon invokes FPB interface 44 to bind the newly added item to a particular action defined in the program for the forwarding path block (226).

Forwarding path 72 having been modified, packet engines 70 execute the forwarding path to process packets accordingly. Packet engines 70 process packets having property value that match the added item using the action of the forwarding path block that is bound to the item in the primitive (228).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
receiving, by a forwarding component of a network device from a control unit of the network device, program text for a program that conforms to a syntax for a high-level forwarding path description language (FPDL), wherein the program text defines a forwarding path element;
compiling, by the forwarding component, the program text to a platform-independent intermediate representation;
compiling, by the forwarding component in response to a request from the control unit, the intermediate representation to generate a forwarding path block having one or more forwarding structures for execution by the forwarding component to process packets;
installing, by the forwarding component, the forwarding path block to an internal packet forwarding path of the forwarding component, the forwarding path element comprising one of a lookup tree, a lookup table, a rate limiter, and a counter;
receiving, by the forwarding component, a packet; and
processing, by the forwarding component, the received packet by executing the forwarding path block including the forwarding path element.

2. The method of claim 1,
wherein to define the forwarding path element the program text defines an instantiation variable for the forwarding path element, and
wherein the program text includes a function that directs the network device to allocate the forwarding path element according to function parameters.

3. The method of claim 1, further comprising:
instantiating additional instances of the forwarding path element for additional forwarding path blocks generated from the program when the program defines the scope for the forwarding path element as local; and
reusing the instance of the forwarding path element with additional forwarding path blocks generated from the program when the program defines the scope for the forwarding path element as global.

4. The method of claim 1,
wherein the program defines one or more actions for a lookup operation on a packet property, and
wherein the forwarding path element comprises one of a lookup table and lookup tree,
wherein the forwarding path element includes one or more items that each binds a packet property value to at least one of the one or more actions, the method further comprising:
receiving, by the forwarding component from the control unit and after installing the forwarding path block to the internal packet forwarding path of the forwarding component, a message including a packet property value and a reference for an action of the one or more actions; and
by forwarding component in response to receiving the message, adding to the lookup primitive an item that binds the packet property value to the action.

5. The method of claim 1,
wherein the forwarding path element comprises a rate limiter,
wherein the program text defines the rate limiter to include one or more stages associated with respective allowable bandwidths for packet flows, and
wherein the program text defines a rate-limit statement for the rate limiter that specifies one or more actions for execution when a packet flow for the received packet exceeds any of the respective allowable bandwidths for the one or more stages bound to the actions.

6. The method of claim 5, further comprising:
receiving, by the forwarding component from the control unit after installing the forwarding path block, a message including a bandwidth value, a reference for an action of the actions, and a reference for a stage of the one or more of the stages; and
by the forwarding component in response to receiving the message, setting an allowable bandwidth for the stage to the bandwidth value and binding the stage to the action to cause the action to execute when the packet flow for the received packet exceeds the bandwidth value.

7. The method of claim 1,
wherein the forwarding component comprises a microprocessor and an application-specific integrated circuit (ASIC) having one or more key engines,
wherein compiling the intermediate representation to generate the forwarding path block comprises compiling, by the microprocessor, the intermediate representation to generate the forwarding path block, and
wherein installing the forwarding path block to the internal packet forwarding path of the forwarding component comprises installing, by the microprocessor, the forwarding path block to the internal packet forwarding path of the forwarding component, the method further comprising: executing, by the one or more key engines, the forwarding path block according to properties of the received packet.

8. A network device comprising:
a forwarding component comprising:
an interface card that receives a packet;
a compiler;
a programming interface; a key engine; and
an internal packet forwarding path comprising programmable, executable microcode that determines processing of the packet; and a control unit comprising:
a computer-readable storage medium configured to store program text for a program that conforms to a high-level forwarding path description language (FPDL), wherein the program text defines a forwarding path element; and
a forwarding component interface configured to send program text for the program to the forwarding component,
wherein the programming interface is configured to receive the program text,
wherein the compiler is configured to compile the program text to a platform-independent intermediate representation,
wherein the compiler, in response to a request by the control unit, is configured to compile the intermediate representation to generate a forwarding path block having one or more forwarding structures for execution by the forwarding component to process the packet,
wherein the programming interface is configured to install the forwarding path block to the internal packet forwarding path of the forwarding component, the forwarding path element comprising one of a lookup tree, a lookup table, a rate limiter, and a counter, and
wherein the key engine is configured to process the packet by executing the forwarding path block including the forwarding path element.

9. The network device of claim 8,
wherein to define the forwarding path element the program text defines an instantiation variable for the forwarding path element, and
wherein the program text includes a function that directs the network device to allocate the forwarding path element according to function parameters.

10. The network device of claim 8,
wherein the forwarding component is configured to instantiate additional instances of the forwarding path element for additional forwarding path blocks generated from the program when the program defines the scope for the forwarding path element as local, and
wherein the forwarding component is configured to reuse the instance of the forwarding path element with additional forwarding path blocks generated from the program when the program defines the scope for the forwarding path element as global.

11. The network device of claim 8,
wherein the program defines one or more actions for a lookup operation on a packet property, and
wherein the forwarding path element comprises one of a lookup table and lookup tree,
wherein the forwarding path element includes one or more items that each binds a packet property value to at least one of the one or more actions,
wherein the forwarding component is configured to receive, from the control unit and after installing the forwarding path block to the internal packet forwarding path of the forwarding component, a message including a packet property value and a reference for an action of the one or more actions, and
wherein the forwarding component is configured to, in response to receiving the message, add to the lookup primitive an item that binds the packet property value to the action.

12. The network device of claim 8,
wherein the forwarding path element comprises a rate limiter,
wherein the program text defines the rate limiter to include one or more stages associated with respective allowable bandwidths for packet flows, and
wherein the program text defines a rate-limit statement for the rate limiter that specifies one or more actions for execution when a packet flow for the received packet exceeds any of the respective allowable bandwidths for the one or more stages bound to the actions.

13. The network device of claim 12,
wherein the forwarding component is configured to receive, from the control unit after installing the forwarding path block, a message including a bandwidth value, a reference for an action of the actions, and a reference for a stage of the one or more of the stages, and
wherein the forwarding component is configured to, in response to receiving the message, set an allowable bandwidth for the stage to the bandwidth value and bind the stage to the action to cause the action to execute when the packet flow for the received packet exceeds the bandwidth value.

14. The network device of claim 8,
wherein the forwarding component comprises a microprocessor and an application-specific integrated circuit (ASIC) having one or more key engines,
wherein to compile the intermediate representation to generate the forwarding path block, the microprocessor is configured to compile the intermediate representation to generate the forwarding path block, and
wherein to install the forwarding path block to the internal packet forwarding path of the forwarding component, the microprocessor is configured to install the forwarding path block to the internal packet forwarding path of the forwarding component,
wherein the one or more key engines are configured to execute the forwarding path block according to properties of the received packet.

15. A forwarding component for a network device, the forwarding component comprising:
a microprocessor and an integrated circuit,
wherein the microprocessor is configured to:
receive program text for a program that conforms to a syntax for a high-level forwarding path description language (FPDL), wherein the program text defines a forwarding path element;
compile the program text to a platform-independent intermediate representation;
compile the intermediate representation to generate a forwarding path block having one or more forwarding structures for execution by the forwarding component to process packets;
install the forwarding path block to an internal packet forwarding path of the forwarding component, the forwarding path element comprising one of a lookup tree, a lookup table, a rate limiter, and a counter,
wherein the integrated circuit is configured to: receive a packet and process the received packet by executing the forwarding path block including the forwarding path element.

16. The forwarding component of claim 15,
wherein to define the forwarding path element the program text defines an instantiation variable for the forwarding path element, and
wherein the program text includes a function that directs the network device to allocate the forwarding path element according to function parameters.

17. The forwarding component of claim 15,
wherein the program defines one or more actions for a lookup operation on a packet property, and
wherein the forwarding path element comprises one of a lookup table and lookup tree,
wherein the forwarding path element includes one or more items that each binds a packet property value to at least one of the one or more actions, and
wherein the microprocessor is further configured to:
receive, after installing the forwarding path block to the internal packet forwarding path of the forwarding component, a message including a packet property value and a reference for an action of the one or more actions; and
in response to receiving the message, add to the lookup primitive an item that binds the packet property value to the action.

18. The forwarding component of claim 15,
wherein the forwarding path element comprises a rate limiter,
wherein the program text defines the rate limiter to include one or more stages associated with respective allowable bandwidths for packet flows, and
wherein the program text defines a rate-limit statement for the rate limiter that specifies one or more actions for execution when a packet flow for the received packet exceeds any of the respective allowable bandwidths for the one or more stages bound to the actions.

19. The forwarding component of claim 18, wherein the microprocessor is further configured to:
receive, after installing the forwarding path block, a message including a bandwidth value, a reference for an action of the actions, and a reference for a stage of the one or more of the stages; and
in response to receiving the message, set an allowable bandwidth for the stage to the bandwidth value and binding the stage to the action to cause the action to execute when the packet flow for the received packet exceeds the bandwidth value.

20. The forwarding component of claim 15,
wherein the integrated circuit comprises an application-specific integrated circuit (ASIC) having one or more key engines,
wherein the one or more key engines are configured to execute the forwarding path block according to properties of the received packet.

* * * * *